US008803869B2

(12) United States Patent
Kato et al.

(10) Patent No.: US 8,803,869 B2
(45) Date of Patent: Aug. 12, 2014

(54) DISPLAY DEVICE AND METHOD OF DRIVING DISPLAY DEVICE

(75) Inventors: Toshiyuki Kato, Osaka (JP); Kouhei Ebisuno, Kyoto (JP)

(73) Assignee: Panasonic Corporation, Osaka (JP)

( * ) Notice: Subject to any disclaimer, the term of this patent is extended or adjusted under 35 U.S.C. 154(b) by 222 days.

(21) Appl. No.: 13/495,419

(22) Filed: Jun. 13, 2012

(65) Prior Publication Data

US 2013/0016091 A1 Jan. 17, 2013

Related U.S. Application Data

(63) Continuation of application No. PCT/JP2011/003989, filed on Jul. 12, 2011.

(51) Int. Cl.
*G06F 3/038* (2013.01)
*G09G 5/00* (2006.01)

(52) U.S. Cl.
USPC .......................................... 345/212; 345/208

(58) Field of Classification Search
USPC .............................. 345/79, 96, 211-213, 208
See application file for complete search history.

(56) References Cited

U.S. PATENT DOCUMENTS

| | | | |
|---|---|---|---|
| 6,518,962 B2 | 2/2003 | Kimura et al. |
| 7,362,322 B2 | 4/2008 | Kimura et al. |
| 7,864,172 B2 | 1/2011 | Miyake et al. |
| 7,973,745 B2 | 7/2011 | Mizukoshi et al. |
| 8,547,307 B2 | 10/2013 | Shirouzu et al. |
| 2002/0180721 A1 | 12/2002 | Kimura et al. |
| 2003/0063081 A1 | 4/2003 | Kimura et al. |
| 2004/0070331 A1 | 4/2004 | Kuno et al. |
| 2007/0080905 A1 | 4/2007 | Takahara |
| 2008/0186297 A1 | 8/2008 | Morita |
| 2008/0266216 A1 | 10/2008 | Choi |
| 2008/0297055 A1 | 12/2008 | Miyake et al. |
| 2009/0207106 A1 | 8/2009 | Mizukoshi et al. |
| 2009/0303162 A1 | 12/2009 | Kohno et al. |
| 2010/0110059 A1 | 5/2010 | Kang et al. |

(Continued)

FOREIGN PATENT DOCUMENTS

| | | |
|---|---|---|
| JP | 2003-280590 | 10/2003 |
| JP | 2004-246250 | 9/2004 |

(Continued)

OTHER PUBLICATIONS

Japan Office Action, mailed Nov. 26, 2013, in the corresponding Japanese Application 2010-525132.

(Continued)

*Primary Examiner* — Ricardo L Osorio
(74) *Attorney, Agent, or Firm* — Greenblum & Bernstein, P.L.C.

(57) ABSTRACT

A display device includes: a reference voltage setting unit, an organic EL display unit; a monitor wire and sample-and-hold circuit which detect at least one of a high-side potential and a low-side potential applied to at least one pixel inside the organic EL display unit; and a variable-voltage source which regulates at least one of a high-side output potential and a low-side output potential outputted from the reference voltage setting unit. The monitor wire and the sample-and-hold circuit perform the detection of the at least one of the high-side potential and the low-side potential in at least part of an image display period, and the monitor wire and the sample-and-hold circuit do not perform the detection of the at least one of the high-side potential and the low-side potential in a black display period.

20 Claims, 13 Drawing Sheets

(56) References Cited

U.S. PATENT DOCUMENTS

| | | | |
|---|---|---|---|
| 2010/0214273 | A1 | 8/2010 | Shirouzu et al. |
| 2010/0259528 | A1 | 10/2010 | Smith et al. |
| 2011/0157134 | A1 | 6/2011 | Ogura |
| 2011/0169798 | A1 | 7/2011 | Lee et al. |
| 2011/0242087 | A1 | 10/2011 | Ebisuno et al. |
| 2013/0285889 | A1 | 10/2013 | Shirouzu et al. |

FOREIGN PATENT DOCUMENTS

| | | |
|---|---|---|
| JP | 2006-065148 | 3/2006 |
| JP | 2006-251602 | 9/2006 |
| JP | 2008-268914 | 11/2008 |
| JP | 2008-299019 | 12/2008 |
| JP | 2009-198691 | 9/2009 |
| JP | 2009-294376 | 12/2009 |
| JP | 2010-199501 | 9/2010 |
| WO | 98/40871 | 9/1998 |
| WO | 2010/001590 | 1/2010 |
| WO | 2011/086597 | 7/2011 |

OTHER PUBLICATIONS

International Search Report in PCT/JP2010/000149, mailed Feb. 9, 2010.

International Search Report in PCT/JP2011/003424, mailed Sep. 27, 2011.

International Search Report in PCT/JP2011/003432, mailed Sep. 27, 2011.

International Search Report in PCT/JP2011/003979, mailed Aug. 16, 2011.

International Search Report in PCT/JP201 1/003609, mailed Sep. 20, 2011.

International Search Report in PCT/JP2011/003989, mailed Aug. 9, 2011.

Official Office Action, dated Jan. 24, 2013, in related U.S. Appl. No. 13/157,577.

U.S. Office Action, mailed Sep. 11, 2013, in related U.S. Appl. No. 13/157,577.

Office Action in U.S. Appl. No. 13/467,462, mailed Aug. 28, 2013.

Office Action, mailed Feb. 24, 2014, in related U.S. Appl. No. 13/467,462.

| Video data (Gradation level) | Required voltage (Red) | Required voltage (Green) | Required voltage (Blue) |
|---|---|---|---|
| 255 | 11.2 | 12.2 | 8.4 |

FIG. 12

| Video data (Gradation level) | Required voltage (Red) | Required voltage (Green) | Required voltage (Blue) |
|---|---|---|---|
| 0 | 4 | 4.2 | 3.5 |
| 1 | 4.1 | 4.3 | 3.5 |
| 2 | 4.1 | 4.4 | 3.6 |
| 3 | 4.2 | 4.5 | 3.6 |
| ⋮ | ⋮ | ⋮ | ⋮ |
| 176 | 8.3 | 9.6 | 6.7 |
| 177 | 8.5 | 9.9 | 6.9 |
| ⋮ | ⋮ | ⋮ | ⋮ |
| 253 | 10.5 | 11.4 | 8.2 |
| 254 | 10.8 | 11.8 | 8.3 |
| 255 | 11.2 | 12.2 | 8.4 |

DISPLAY DEVICE AND METHOD OF DRIVING DISPLAY DEVICE

CROSS REFERENCE TO RELATED APPLICATION

This is a continuation application of PCT Patent Application No. PCT/JP2011/003989 filed on Jul. 12, 2011, designating the United States of America. The entire disclosure of the above-identified application, including the specification, drawings and claims are incorporated herein by reference in its entirety.

TECHNICAL FIELD

Devices consistent with exemplary embodiments relate to active-matrix display devices which use current-driven luminescence elements represented by organic electroluminescence (EL) elements, and more particularly to a display device having excellent power consumption reducing effect.

BACKGROUND ART

In general, the luminance of an organic electroluminescence (EL) element is dependent upon the drive current supplied to the element, and the luminance of the luminescence of the element increases in proportion to the drive current. Therefore, the power consumption of displays made up of organic EL elements is determined by the average of display luminance. Specifically, unlike liquid crystal displays, the power consumption of organic EL displays varies significantly depending on the displayed image.

For example, in an organic EL display, the highest power consumption is required when displaying an all-white image, whereas, in the case of a typical natural image, power consumption which is approximately 20 to 40% of that for all-white is considered to be sufficient.

However, because power source circuit design and battery capacity entail designing which assumes the case where the power consumption of a display becomes highest, it is necessary to consider power consumption that is 3 to 4 times that for the typical natural image, and thus becoming a hindrance to the lowering of power consumption and the miniaturization of devices.

Consequently, there is conventionally proposed a technique which suppresses power consumption with practically no drop in display luminance, by detecting the peak value of video data and adjusting the cathode voltage of the organic EL elements based on such detected data so as to reduce power source voltage (for example, see Patent Literature (PTL) 1).

CITATION LIST

Patent Literature

[PTL 1] Japanese Unexamined Patent Application Publication No. 2006-065148

SUMMARY OF INVENTION

Technical Problem

Now, since an organic EL element is a current-driven element, current flows through a power source wire and a voltage drop which is proportionate to the wire resistance occurs. As such, the power supply voltage to be supplied to the display is set by adding a voltage drop margin for compensating for a voltage drop. In the same manner as the previously described power source circuit design and battery capacity, since the power drop margin for compensating for a voltage drop is set assuming the case where the power consumption of the display becomes highest, unnecessary power is consumed for typical natural images.

In a small-sized display intended for mobile device use, panel current is small and thus, compared to the voltage to be consumed by pixels, the power drop margin for compensating for a voltage drop is negligibly small. However, when current increases with the enlargement of panels, the voltage drop occurring in the power source wire no longer becomes negligible.

However, in the conventional technique in the above-mentioned Patent Reference 1, although power consumption in each of the pixels can be reduced, the power drop margin for compensating for a voltage drop cannot be reduced, and thus the power consumption reducing effect for household large-sized display devices of 30-inches and above is insufficient.

One or more exemplary embodiments are conceived in view of the aforementioned problem and provide a display device having excellent power consumption reducing effect.

Solution to Problem

According to an exemplary embodiment of the present disclosure, a display device includes: a power supplying unit configured to output a high-side output potential and a low-side output potential; a display unit in which a plurality of pixels are arranged and which receives power supply from the power supplying unit; a voltage detecting unit configured to detect at least one of a high-side applied potential and a low-side applied potential which are applied to at least one of the pixels inside the display unit; and a voltage regulating unit configured to regulate at least one of the high-side output potential and the low-side output potential that are outputted from the power supplying unit such that any one of the following potential differences reaches a predetermined potential difference: a potential difference between the high-side applied potential and a reference potential; a potential difference between the low-side applied potential and the reference potential; and a potential difference between the high-side applied potential and the low-side applied potential, wherein the display unit is configured to alternate between image display periods in which at least part of the pixels are used for image display and black display periods in which all of the pixels are used for black display, and the voltage detecting unit is configured to detect the at least one of the high-side applied potential and the low-side applied potential in at least part of each of the image display periods, and refrain from detecting the at least one of the high-side applied potential and the low-side applied potential in the black display periods.

Advantageous Effects of Invention

One or more exemplary embodiments of the present disclosure can provide of a display device having excellent power consumption reducing effect.

BRIEF DESCRIPTION OF DRAWINGS

These and other objects, advantages and features of the exemplary embodiments of the disclosure will become apparent from the following description thereof taken in conjunction with the accompanying drawings that illustrate a specific embodiment of the present disclosure. In the Drawings:

FIG. 12 is a chart showing an example of the required voltage conversion table provided in a signal processing circuit according to Embodiment 2;

DESCRIPTION OF EMBODIMENT(S)

Figure 1:
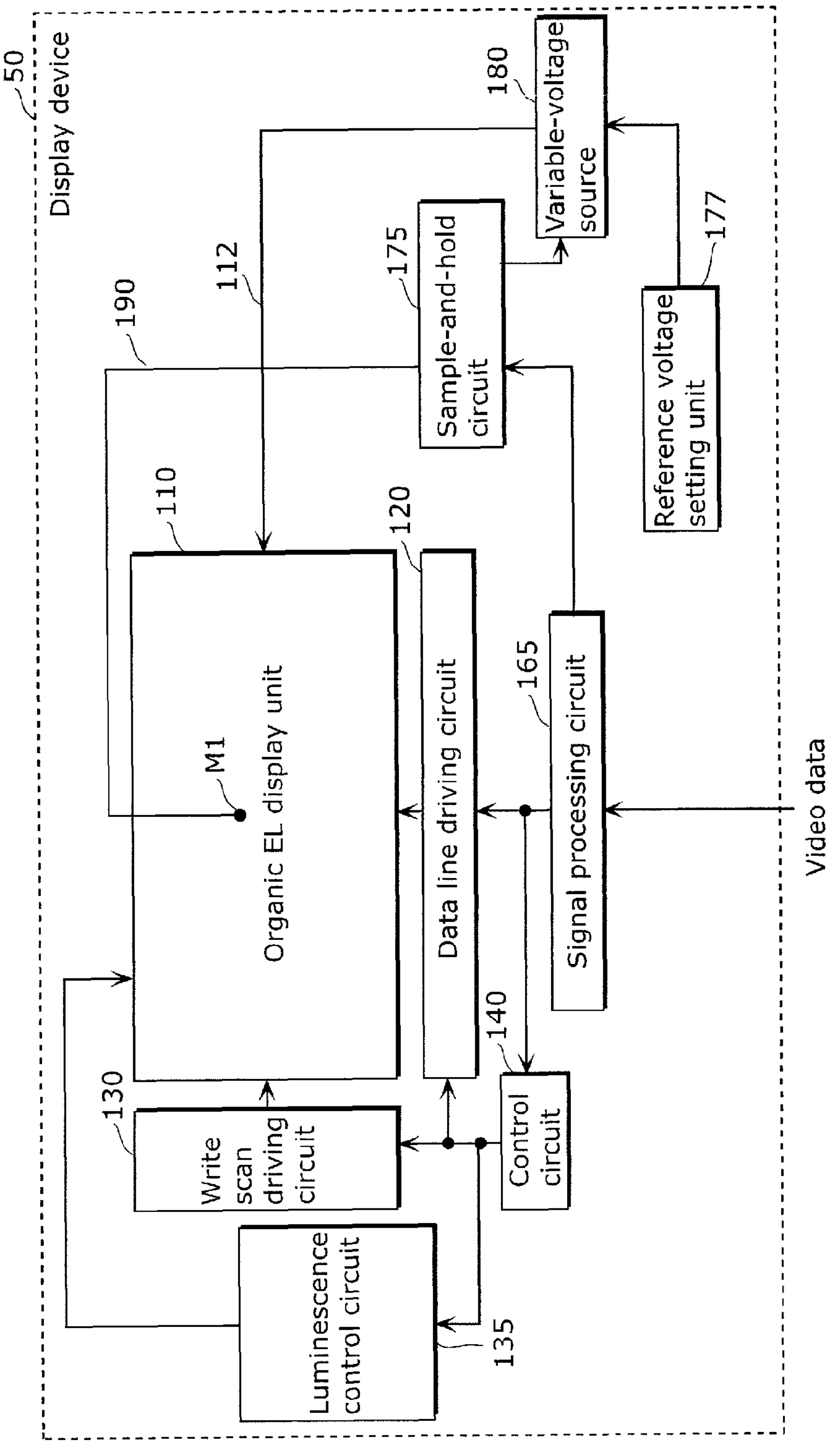
FIG. 1 is a block diagram showing an outline configuration of a display device according to Embodiment 1 of the present disclosure.

The display device according to an exemplary embodiment of the present disclosure includes: a power supplying unit configured to output a high-side output potential and a low-side output potential; a display unit in which a plurality of pixels are arranged and which receives power supply from the power supplying unit; a voltage detecting unit configured to detect at least one of a high-side applied potential and a low-side applied potential which are applied to at least one of the pixels inside the display unit; and a voltage regulating unit configured to regulate at least one of the high-side output potential and the low-side output potential that are outputted from the power supplying unit such that any one of the following potential differences reaches a predetermined potential difference: a potential difference between the high-side applied potential and a reference potential; a potential difference between the low-side applied potential and the reference potential; and a potential difference between the high-side applied potential and the low-side applied potential, wherein the display unit is configured to alternate between image display periods in which at least part of the pixels are used for image display and black display periods in which all of the pixels are used for black display, and the voltage detecting unit is configured to detect the at least one of the high-side applied potential and the low-side applied potential in at least part of each of the image display periods, and refrain from detecting the at least one of the high-side applied potential and the low-side applied potential in the black display periods.

When pixel voltage detection is performed at all times throughout the image display period and the black display period, there is the problem that the voltage supplied to the pixels in the image display period and the black display period fluctuates significantly, unnecessary radiation due to noise occurs, and power loss due to the charging and discharging of the panel capacitance occurs.

In the present embodiment, pixel voltage detection is performed only in the image display period, and a voltage that is regulated based on the voltage detected in the image display period is supplied to the panel in the image display period and the black display period, and thus it is possible to provide a display device having excellent power consumption reducing effect, in which the voltage supplied to the pixels does not fluctuate significantly.

Furthermore, in the display device according to an exemplary embodiment of the present disclosure, the voltage detecting unit may include a sample-and-hold circuit which samples and holds the at least one of the high-side applied potential and the low-side applied potential based on a sampling signal.

Accordingly, since it is possible to sample and hold the potential only in a predetermined period, it is possible to efficiently provide a display device having excellent power consumption reducing effect.

Furthermore, in the display device according to an exemplary embodiment of the present disclosure, the sample-and-hold circuit may sample the at least one of the high-side applied potential and the low-side applied potential from a start of each of the image display periods, and hold the sampled applied potential before an end of the image display period.

Accordingly, the voltage detection in the image display period can be performed as long as it is from the start of the image display period. Furthermore, by performing the holding of the potential before the end of the image display period, the voltage detection within the image display period can be performed reliably without performing the voltage detection in the black display period.

Furthermore, in the display device according to an exemplary embodiment of the present disclosure, the sample-and-hold circuit may perform the sampling simultaneously with the start of the image display period.

Accordingly, even when the image display period is short, the voltage detection in the image display period can be performed reliably.

Furthermore, in the display device according to an exemplary embodiment of the present disclosure, the sample-and-hold circuit may perform the sampling for a period that is shorter than the image display period.

Accordingly, the voltage detection within the image display period can be performed reliably without performing the voltage detection in the black display period.

Furthermore, in the display device according to an exemplary embodiment of the present disclosure, the sample hold circuit may perform the sampling more than once within one of the image display periods.

Accordingly, even when the voltage changes during voltage detection, voltage detection in the image display period can be performed accurately.

Furthermore, in the display device according to an exemplary embodiment of the present disclosure, each of the pixels may include an organic electroluminescence (EL) element.

Accordingly, it is possible to reduce power consumption in a display panel that uses an organic EL element that is of the current-driven type.

Furthermore, in the display device according to an exemplary embodiment of the present disclosure, the display unit may be configured to alternately display images for a right eye and images for a left eye, in two of the image display periods that are successive via one of the black display periods, and the images for the right eye and the images for the left eye may be viewed as three-dimensional images via a pair of eyeglasses that allow sequential viewing of the images for the right eye and the images for the left eye.

Accordingly, it is possible to provide a display device having excellent power consumption reducing effect, even in the case of displaying three-dimensional images.

Furthermore, in the display device according to an exemplary embodiment of the present disclosure, the display unit may be configured to display images according to a subfield method in which one frame is divided into subfields having different image display periods, and a subfield is selected from among the subfields according to display gradation level.

Accordingly, it is possible to provide a display device having excellent power consumption reducing effect even in the case where, according to the subfield method, the image display periods are different among plural subfields.

Furthermore, in the display device according to an exemplary embodiment of the present disclosure, the voltage detecting unit may be configured to refrain from detecting the at least one of the high-side applied potential and the low-side applied potential in an image display period in which a full-screen black image is displayed, among the image display periods.

Accordingly, aside from the black display period in which writing of image data is performed, voltage detection is also not performed when a full-screen black image is displayed in the image display period, and thus it is possible to provide a display device having more excellent power consumption reducing effect.

Furthermore, in the display device according to an exemplary embodiment of the present disclosure, the display unit may be configured to cause the pixels to simultaneously produce luminescence in the image display periods, and cause the pixels to simultaneously stop producing luminescence in the black display periods.

Accordingly, since it is possible to cause the pixels to stop luminescence production while image data is being written into the display device, and cause the pixels to produce luminescence concurrently after the writing of image data ends, it is possible to provide a fresh image as well as reduce power consumption.

Furthermore, in the display device according to an exemplary embodiment of the present disclosure, the at least one of the pixels from which the high-side applied potential is detected and the at least one of the pixels from which the low-side applied potential is detected may be different pixels.

Accordingly, when the voltage drop distribution of the high-side potential power source line and the voltage drop (rise) distribution of the low-side potential power source line are different, the output potential of the power supplying unit can be regulated based on potential information from different pixels, and thus power consumption can be reduced more effectively.

Furthermore, in the display device according to an exemplary embodiment of the present disclosure, at least one of (i) the number of the at least one of the pixels from which the high-side applied potential is detected and (ii) the number of the at least one of the pixels from which the low-side applied potential is detected may be plural.

Accordingly, when one of the high-side potential and the low-side potential that are detected is plural in number, it is possible to select the optimal potential for the regulation of voltage to be supplied to the display unit. Therefore, the output potential from the power supplying unit can be more accurately regulated. Therefore, power consumption can be effectively reduced even when the size of the display unit is increased.

Furthermore, in a display device according to an exemplary embodiment of the present disclosure, the voltage regulating unit may be configured to select at least one applied potential out of (i) a lowest applied potential among high-side applied potentials detected by the voltage detecting unit; and (ii) a highest applied potential among low-side applied potentials detected by the voltage detecting unit, and regulate the power supplying unit based on the selected at least one applied potential.

Accordingly, since it is possible to select the highest or lowest potential from among the plural detected potentials, the output potential from the power supplying unit can be more accurately regulated. Therefore, power consumption can be effectively reduced even when the size of the display unit is increased.

Furthermore, a display device according to an exemplary embodiment of the present disclosure may further include at least one of: a high-side potential detecting line having one end connected to the at least one of the pixels from which the high-side applied potential is detected and the other end connected to the voltage regulating unit, for transmitting the high-side applied potential; and a low-side potential detecting line having one end connected to the at least one of the pixels from which the low-side applied potential is detected and the other end connected to the voltage regulating unit, for transmitting the low-side applied potential.

With this, the voltage detecting unit can measure at least one of (i) the high-side potential applied to the at least one pixel via the high-side potential detecting line and (ii) the low-side potential applied to at least one pixel via the low-side potential detecting line.

Furthermore, in a display device according to an exemplary embodiment of the present disclosure, the voltage detecting unit may be further configured to detect at least one of the high-side output potential and the low-side output potential that are outputted from the power supplying unit, and the voltage regulating unit may be configured to regulate the at least one of the high-side output potential and the low-side output potential that are outputted from the power supplying unit, in accordance with at least one potential difference out of (i) a potential difference between the high-side output potential outputted by the power supplying unit and the high-side applied potential applied to the at least one of the pixels and (ii) a potential difference between the low-side output potential outputted by the power supplying unit and the low-side applied potential applied to the at least one of the pixels.

Accordingly, by regulating at least one of the high-side output potential of the power supplying unit and the low-side output potential of the power supplying unit in accordance with the amount of voltage drop occurring from the power supplying unit to at least one pixel, power consumption can be reduced.

Furthermore, in a display device according to an exemplary embodiment of the present disclosure, the voltage regulating unit may be configured to regulate the at least one of the high-side output potential and the low-side output potential that are outputted from the power supplying unit, so that (i) the at least one potential difference and (ii) at least one of the potential difference between the high-side applied potential and the reference potential and the potential difference between the low-side applied potential and the reference potential are in an increasing function relationship.

Accordingly, since the voltage fluctuation with respect to the reference voltage is detected, power consumption can be reduced by regulating at least one of the high-side output potential of the power supplying unit and the low-side output potential of the power supplying unit in accordance with the amount of voltage drop occurring from the power supplying unit to at least one pixel.

Furthermore, in a display device according to an exemplary embodiment of the present disclosure, the voltage detecting unit may be further configured to detect at least one of (i) a high-side potential in a current path connecting the power supplying unit and a high potential side of the pixels and (ii) a low-side potential in current path connecting the power supplying unit and a low potential side of the pixels, and the voltage regulating unit may be configured to regulate the at least one of the high-side output potential and the low-side output potential that are outputted from the power supplying unit, in accordance with at least one potential difference out of (i) a potential difference between the high-side potential in the current path connecting the power supplying unit and the high potential side of the pixels and the high-side applied potential applied to the at least one of the pixels and (ii) a potential difference between the low-side potential in the current path connecting the power supplying unit and the low potential side of the pixels and the low-side applied potential applied to the at least one of the pixels.

Accordingly, the output voltage from the power supplying unit can be regulated in accordance with the voltage drop amount within the display region only, by detecting the potential difference between the voltage applied to the pixels and the voltage in the wiring path outside the display region.

Furthermore, in a display device according to an exemplary embodiment of the present disclosure, the voltage regulating unit may be configured to perform the regulating so that (i) the at least one potential difference and (ii) at least one of the potential difference between the high-side applied potential and the reference potential and the potential difference between the low-side applied potential and the reference potential are in an increasing function relationship.

Accordingly, the high-side output potential of the power supplying unit and the low-side output potential of the power supplying unit can be regulated more appropriately, and thus power consumption can be reduced further.

Furthermore, in a display device according to an exemplary embodiment of the present disclosure, each of the pixels may include: a driver having a source electrode and a drain electrode; and a luminescence element having a first electrode and a second electrode, the first electrode being connected to one of the source electrode and the drain electrode of the driver, the high-side applied potential may be applied to one of the second electrode and the other of the source electrode and the drain electrode, and the low-side applied potential may be applied to the other of the second electrode and the other of the source electrode and the drain electrode.

Furthermore, in a display device according to an exemplary embodiment of the present disclosure, the pixels may be arranged in rows and columns; the display device may further include a first power source line and a second power source line, the first power source line connecting the others of the source electrode and the drain electrode of the respective drivers of adjacent pixels in at least one of the row direction and the column direction, and the second power source line connecting the second electrodes of the respective luminescence elements of adjacent pixels in the row direction and the column direction; and the pixels may receive the power supply from the power supplying unit via the first power source line and the second power source line.

Furthermore, in a display device according to an exemplary embodiment of the present disclosure, the second electrode and the second power source line may be part of a common electrode that is common to the pixels, and may be electrically connected to the power supplying unit so that a potential is applied to the common electrode from a periphery of the common electrode.

Furthermore, in a display device according to an exemplary embodiment of the present disclosure, the second electrode may comprise a transparent conductive material including a metal oxide.

Furthermore, a method of driving a display device according to an exemplary embodiment of the present disclosure is a method of driving a display device including a power supplying unit which outputs a high-side output potential and a low-side output potential and a display unit in which a plurality of pixels are arranged and which receives power supply from the power supplying unit, the method including: detecting at least one of a high-side applied potential and a low-side applied potential which are applied to at least one of the pixels inside the display unit; regulating at least one of the high-side output potential and the low-side output potential that are outputted from the power supplying unit such that any one of the following potential differences reaches a predetermined potential difference: a potential difference between the high-side applied potential and a reference potential; a potential difference between the low-side applied potential and the reference potential; and a potential difference between the high-side applied potential and the low-side applied potential, wherein the display unit is configured to alternate between image display periods in which at least part of the pixels are used for image display and black display periods in which all of the pixels are used for black display, and the detecting is performed in at least part of each of the image display periods, and is not performed in the black display periods.

Accordingly, pixel voltage detection is performed only in the image display period, and a voltage that is regulated based on the voltage detected in the image display period is supplied to the panel in the image display period and the black display period, and thus it is possible to provide a display device having excellent power consumption reducing effect, in which the voltage supplied to the pixels does not fluctuate significantly.

Hereinafter, the certain embodiments of the present disclosure shall be described based on the Drawings. It is to be noted that, in all the figures, the same reference numerals are given to the same or corresponding elements and redundant description thereof shall be omitted.

Embodiment 1

The display device according to an exemplary embodiment of the present disclosure includes: a power supplying unit configured to output a high-side output potential and a low-side output potential; a display unit in which a plurality of pixels are arranged and which receives power supply from the power supplying unit; a voltage detecting unit configured to detect at least one of a high-side applied potential and a low-side applied potential which are applied to at least one of the pixels inside the display unit; and a voltage regulating unit configured to regulate at least one of the high-side output potential and the low-side output potential that are outputted from the power supplying unit such that any one of the following potential differences reaches a predetermined potential difference: a potential difference between the high-side applied potential and a reference potential; a potential difference between the low-side applied potential and the reference potential; and a potential difference between the high-side applied potential and the low-side applied potential, wherein the display unit is configured to alternate between image display periods in which at least part of the pixels are used for image display and black display periods in which all of the pixels are used for black display, and the voltage detecting unit is configured to detect the at least one of the high-side applied potential and the low-side applied potential in at least part of each of the image display periods, and refrain from detecting the at least one of the high-side applied potential and the low-side applied potential in the black display periods.

Accordingly, the display device according to this embodiment realizes excellent power consumption reducing effect.

Hereinafter, Embodiment 1 of the present disclosure shall be specifically described with reference to the Drawings.

FIG. 1 is a block diagram showing an outline configuration of the display device according to Embodiment 1 of the present disclosure.

A display device 50 shown in the figure includes an organic electroluminescence (EL) display unit 110, a data line driving circuit 120, a write scan driving circuit 130, a luminescence control circuit 135, a control circuit 140, a signal processing circuit 165, a sample-and-hold circuit 175, a reference voltage setting unit 177, a variable-voltage source 180, and a monitor wire 190.

Figure 2:
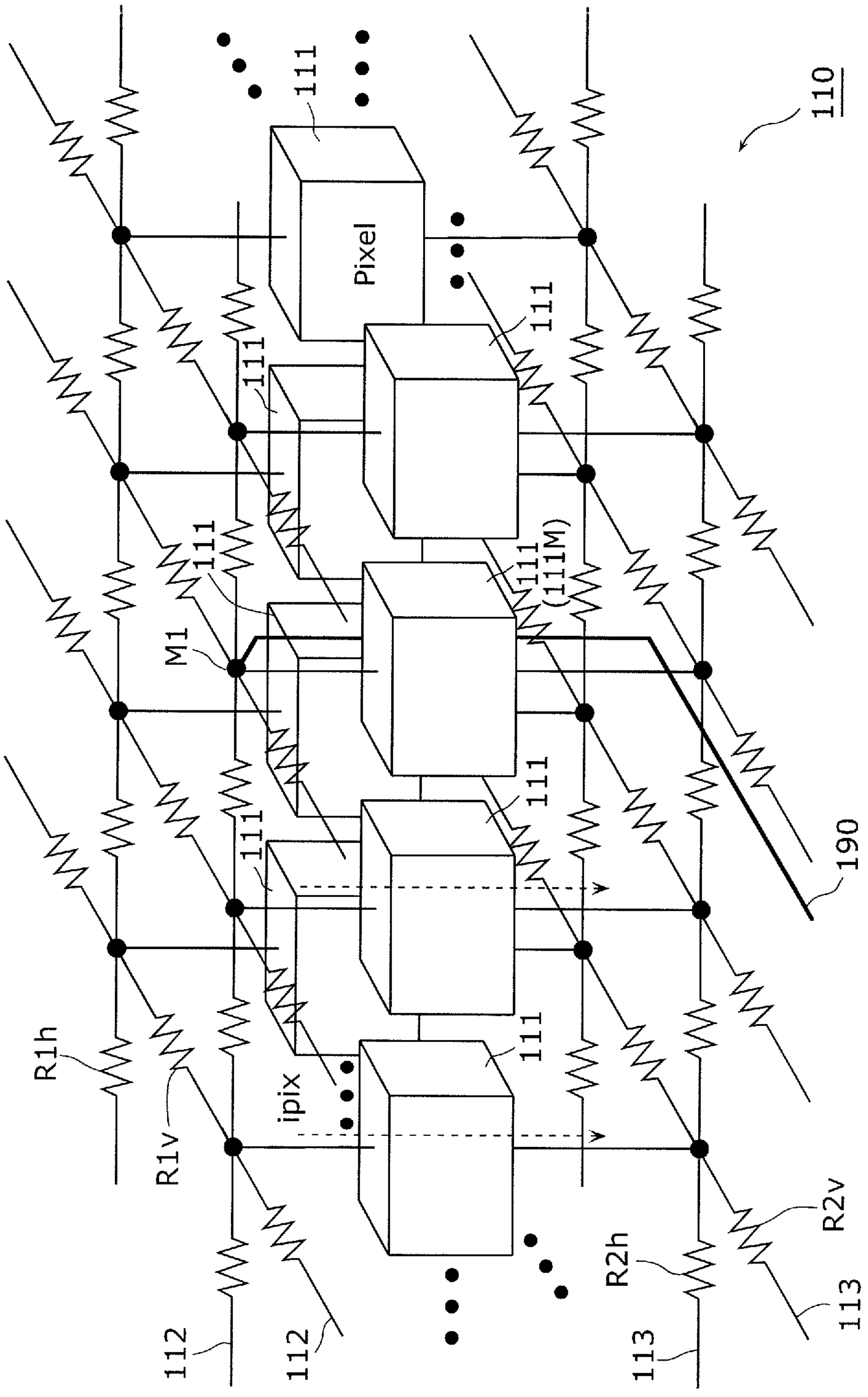
FIG. 2 is a perspective view schematically showing a configuration of an organic EL display unit according to Embodiment 1.

FIG. 2 is a perspective view schematically showing a configuration of the organic EL display unit 110 according to Embodiment 1. It is to be noted that the upper portion of the figure is the display screen side.

As shown in the figure, the organic EL display unit 110 includes the pixels 111, the first power source wire 112, and the second power source wire 113.

Each pixel 111 is connected to the first power source wire 112 and the second power source wire 113, and produces luminescence at a luminance that is in accordance with a pixel current ipix that flows to the pixel 111. At least one predetermined pixel out of the pixels 111 is connected to the monitor wire 190 at a detecting point M1. Hereinafter, the pixel 111 that is directly connected to the monitor wire 190 shall be denoted as the monitor pixel 111M. The monitor pixel 111M is located near the center of the organic EL display unit 110. It is to be noted that near the center includes the center and the surrounding parts thereof.

The first power source wire 112 is arranged in a net-like manner. On the other hand, the second power source wire 113 is formed in the form of a continuous film on the organic EL display unit 110, and potential outputted by the variable-voltage source 180 is applied to the second power source wire 113 from the periphery of the organic EL display unit 110. In FIG. 2, the first power source wire 112 and the second power source wire 113 are schematically illustrated in mesh-form in order to show the resistance components of the first power source wire 112 and the second power source wire 113. It is to be noted that the second power source wire 113 is, for example, a grounding wire, and may be grounded to a common grounding potential of the display device 100, at the periphery of the organic EL display unit 110.

A horizontal first power source wire resistance R1*h* and a vertical first power source wire resistance R1*v* are present in the first power source wire 112. A horizontal second power source wire resistance R2*h* and a vertical second power source wire resistance R2*v* are present in the second power source wire 113. It is to be noted that, although not illustrated, each of the pixels 111 is connected to the write scan driving circuit 130, the luminescence control circuit 135, and the data line driving circuit 120 via a scanning line 123 for controlling the writing of signal voltage to the pixel 111, a luminescence control line 128 for controlling the timing at which the pixel 111 produces luminescence and stops producing luminescence, and a data line 122 for supplying a signal voltage corresponding to the luminescence luminance of the pixel 111.

Figure 3:
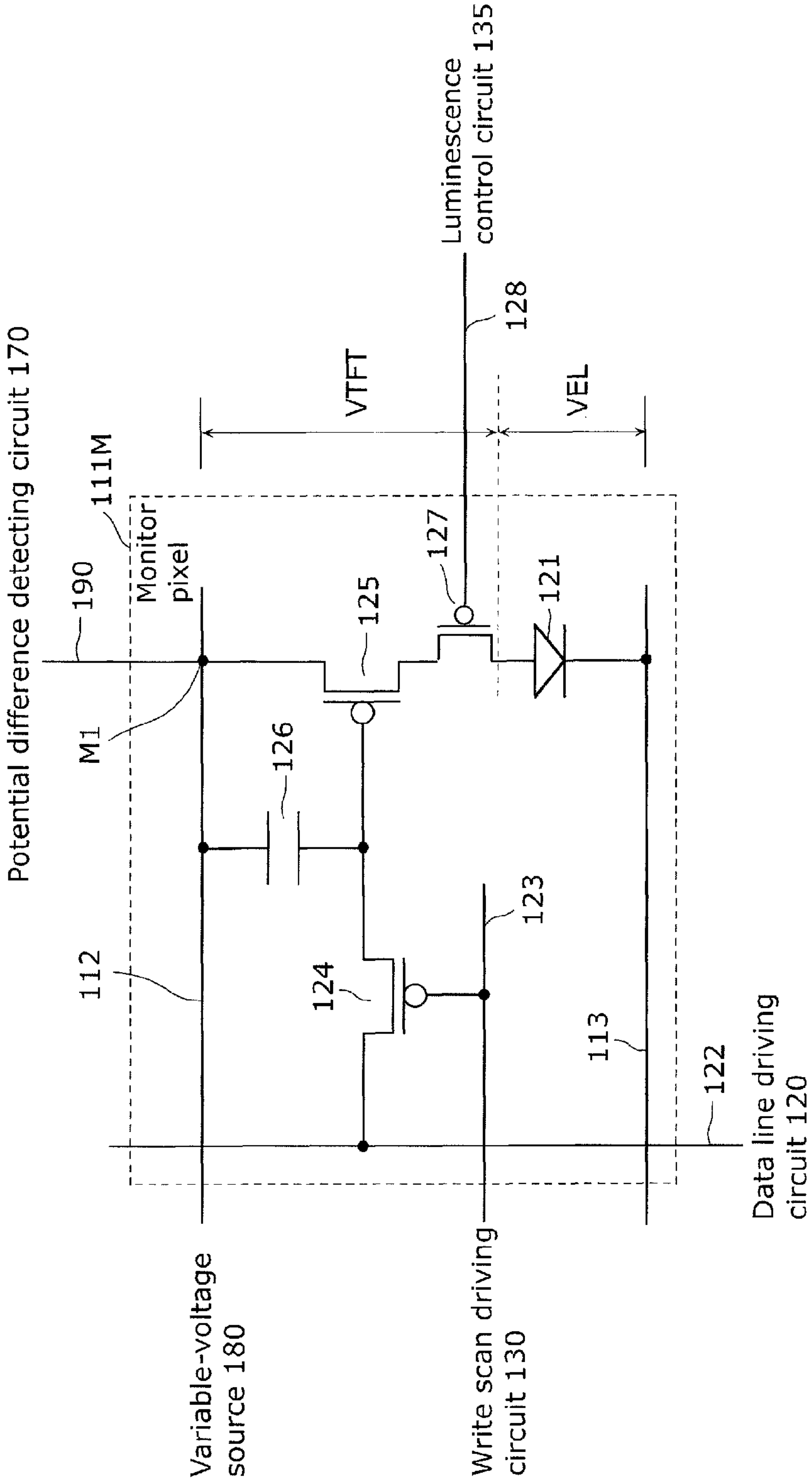
FIG. 3 is a circuit diagram showing an example of a specific configuration of monitor pixel.

FIG. 3 is a circuit diagram showing an example of a specific configuration of the monitor pixel 111M.

The pixel 111 shown in the figure includes a driver and a luminescence element. The driver includes a source electrode and a drain electrode. The luminescence element includes a first electrode and a second electrode. The first electrode is connected to one of the source electrode and the drain electrode of the driver via a luminescence control transistor 127. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, each of the pixels 111 includes an organic EL element 121, a data line 122, a scanning line 123, a luminescence control line 128, a switch transistor 124, a driving transistor 125, a holding capacitor 126, and a luminescence control transistor 127. The pixels 111 are, for example, arranged in a matrix in the organic EL display unit 110.

The organic EL element 121, which is the luminescent element, has an anode connected to the drain of the driving transistor 125 via the luminescence control transistor 127, and a cathode connected to the second power source wire 113, and produces luminescence with a luminance that is in accordance with the current value flowing between the anode and the cathode. The cathode electrode of the organic EL element 121 forms part of a common electrode provided in common to the pixels 111. The common electrode is electrically connected to the variable-voltage source 180 so that potential is applied to the common electrode from the periphery thereof. Specifically, the common electrode functions as the second power source wire 113 in the organic EL display unit 110. Furthermore, the cathode electrode is formed from a transparent conductive material made of a metallic oxide. It is to be noted that the anode electrode of the organic EL element 121 is the first electrode, and the cathode electrode of the organic EL element 121 is the second electrode.

The data line 122 is connected to the data line driving circuit 120 and one of the source and the drain of the switch transistor 124, and signal voltage corresponding to the video data is applied to the data line 122 by the data line driving circuit 120.

The scanning line 123 is connected to the write scan driving circuit 130 and the gate of the switch transistor 124, and turns the switching transistor 1240N and OFF according to the voltage applied by the write scan driving circuit 130.

The switching transistor 124 has one of a source and a drain connected to the data line 122, the other of the source and the drain connected to the gate of the driving transistor 125 and one end of the holding capacitor 126, and is, for example, a P-type thin-film transistor (TFT).

The driving transistor 125, which is the driver, has a source connected to the first power source wire 112, a drain connected to the anode of the organic EL element 121 via the luminescence control transistor 127, a and a gate connected to one end of the holding capacitor 126 and the other of the source and the drain of the switch transistor 124, and is, for example, a P-type TFT. With this, the driving transistor 125 supplies the organic EL element 121 with current that is in accordance with the voltage held in the holding capacitor 126. Furthermore, in the monitor pixel 111M, the source of the driving transistor 125 is connected to the monitor wire 190.

The holding capacitor 126 has the one end connected to the other of the source and the drain of the switch transistor 124, and the other end connected to the first power source wire 112, and holds the potential difference between the potential of the first power source wire 112 and the potential of the gate of the driving transistor 125 when the switch transistor 124 is turned OFF. Specifically, the holding capacitor 126 holds a voltage corresponding to the signal voltage.

The data line driving circuit 120 outputs a signal voltage corresponding to the video data, to the pixels 111 via the data lines 122.

The write scan driving circuit 130 sequentially scans the pixels 111 by outputting a scanning signal to the scanning lines 123. Specifically, the switch transistors 124 are turned ON and OFF on a row-basis. With this, the signal voltages outputted to the data lines 122 are applied to the pixels 111 in the row selected by the write scan driving circuit 130. Thus, the signal voltages are written into the respective pixels 111.

The luminescence control circuit 135 turns the luminescence control transistor 127ON or OFF by outputting a luminescence control signal to the luminescence control line 128, so as to cause the pixel 111 to produce luminescence or stop producing luminescence.

The control circuit 140 instructs the drive timing to each of the data line driving circuit 120, the write scan driving circuit 130, and luminescence control circuit 135.

The signal processing circuit 165 outputs, to the data line driving circuit 120, a signal voltage corresponding to the inputted video data.

The sample-and-hold circuit 175 performs a sample-and-hold operation, based on a sample pulse from the signal processing circuit 165. The sample-and-hold circuit 175 samples the potential at the detecting point M1 and continues to output such sampled potential to the variable-voltage source 180, according to the pulse timing of the sample pulse from the signal processing circuit 165. In periods other than the sampling period, the sample-and-hold circuit 175 holds the potential at the detecting point M1 that was sampled immediately before such period and continues outputting such potential to the variable-voltage source 180. It is to be noted that the monitor wire 190 and the sample-and-hold circuit 175 correspond to the voltage detecting unit.

The reference voltage setting unit 177 outputs a first reference voltage Vref1 to the variable-voltage source 180. The first reference voltage Vref1 is a voltage corresponding to the total VTFT+VEL of the voltage VEL required by the organic EL element 121 and the voltage VTFT required by the driving transistor 125.

The variable-voltage source 180, which is the voltage regulating unit, regulates the output voltage so as to set the potential of the monitor pixel 111 to a predetermined potential. The variable-voltage source 180 measures the high-side potential applied to the monitor pixel 111M, via the monitor wire 190 and the sample-and-hold circuit 175. Specifically, the variable-voltage source 180 measures the potential at the detecting point M1. Subsequently, the variable-voltage source 180 regulates the output voltage Vout in accordance with the first reference voltage Vref1 outputted by the reference voltage setting unit 177. It is to be noted that the variable-voltage source 180 may measure the low-side potential applied to the monitor pixel 111M.

The monitor wire 190 has one end connected to the detecting point M1 and the other end connected to the sample-and-hold circuit 175, and transmits the potential at the detecting point M1 to the variable-voltage source 180. With this, the potential of the monitor pixel 111M is held in the sample-and-hold circuit 175 from when the sample pulse is inputted up to when the next sample pulse is inputted.

Next, a detailed configuration of the variable-voltage source 180 shall be briefly described.

Figure 4:
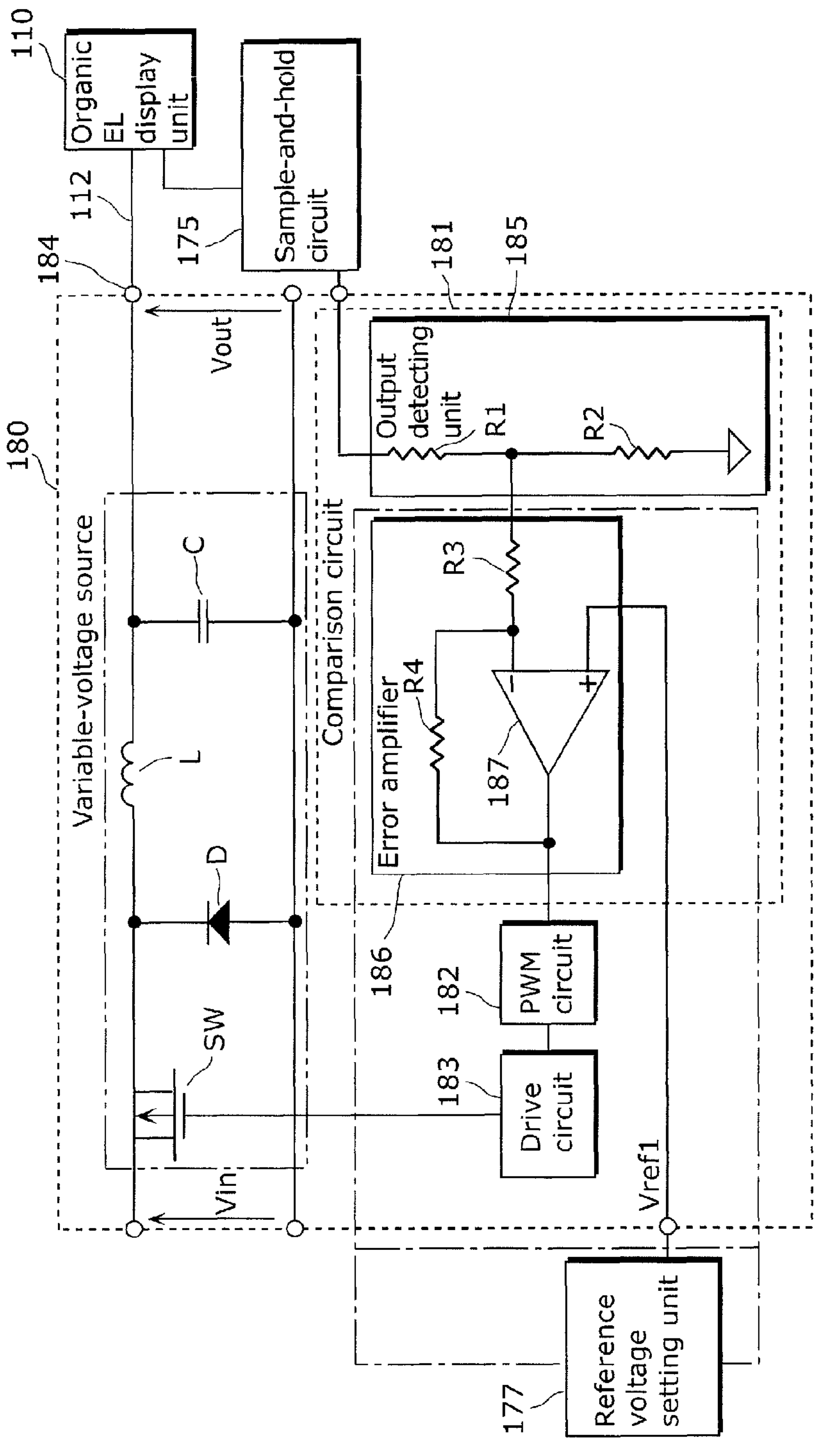
FIG. 4 is a block diagram showing an example of a specific configuration of a variable-voltage source according to Embodiment 1.

FIG. 4 is a block diagram showing an example of a specific configuration of the variable-voltage source 180 according to Embodiment 1. It is to be noted that the organic EL display unit 110, the sample-and-hold circuit 175, and the reference voltage setting unit 177 which are connected to the variable-voltage source are also shown in the figure.

The variable-voltage source 180 shown in the figure includes a comparison circuit 181, a pulse width modulation (PWM) circuit 182, a drive circuit 183, a switch SW, a diode D, an inductor L, a capacitor C, and an output terminal 184, and converts an input voltage Vin into an output voltage Vout which is in accordance with the first reference voltage Vref1A, and outputs the output voltage Vout from the output terminal 184. It is to be noted that, although not illustrated, an AC-DC converter is provided in a stage ahead of an input terminal to which the input voltage Vin is inputted, and it is assumed that conversion, for example, from 100V AC to 20V DC is already carried out.

The comparison circuit 181 includes an output detecting unit 185 and an error amplifier 186, and outputs, to the PWM circuit 182, a voltage that is in accordance with the difference between the potential at the detecting point M1 and the first reference voltage Vref1 inputted from the reference voltage setting unit 177.

The output detecting unit 185, which includes two resistors R1 and R2 provided between the sample-and-hold circuit 175 and a grounding potential, voltage-divides the potential at the detection point M1 in accordance with the resistance ratio between the resistors R1 and R2, and outputs the voltage-divided potential at the detecting point M1 to the error amplifier 186.

The error amplifier 186 compares the potential at the detecting point M1 that has been voltage-divided by the output detection unit 185 and the first reference voltage Vref1 outputted by the reference voltage setting unit 177, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the reference voltage setting unit 177, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1 inputted from the reference voltage setting unit 177. Stated differently, the error amplifier 186 outputs, to the PWM circuit 182, a voltage that is in accordance with the potential difference between the potential at the detecting point M1 and the first reference voltage Vref1.

Here, assuming that the output potential of the variable-voltage source 180 is Vout, and the voltage drop amount from the output terminal 184 of the variable-voltage source 180 to the detecting point M1 is ΔV, the potential at the detecting point M1 becomes Vout−ΔV. Specifically, in this embodiment, the comparison circuit 181 compares Vref1 and Vout−ΔV. As described above, since Vref1=VTFT+VEL, it can be said that the comparison circuit 181 is comparing VTFT+VEL and Vout−ΔV.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse wave having a long ON duty when the potential difference between the potential at the detection point M1 and the first reference voltage Vref1 is big, and outputs a pulse wave having a short ON duty when the potential difference between the potential at the detection point M1 and the first reference voltage Vref1 is small. It is to be noted that the ON period of a pulse waveform is a period in which the pulse waveform is active.

The drive circuit 183 turns ON the switch SW during the period in which the pulse waveform outputted by the PWM circuit 182 is active, and turns OFF the switch SW during the period in which the pulse waveform outputted by the PWM circuit 182 is inactive.

The switch SW is turned ON and OFF by the drive circuit 183. The input voltage Vin is outputted, as the output voltage Vout, to the output terminal 184 via the inductor L and the capacitor C only while the switch SW is ON. Accordingly, from 0V, the output voltage Vout gradually approaches 20V (Vin).

As the potential at the detecting point M1 approaches the first reference voltage Vref1, the voltage inputted to the PWM circuit 182 decreases, and the ON duty of the pulse signal outputted by the PWM circuit 182 becomes shorter.

Then, the time in which the switch SW is ON becomes shorter, and the potential at the detecting point M1 gently converges with the first reference voltage Vref1.

The potential of the output voltage Vout, while having slight voltage fluctuations, eventually settles to a potential in the vicinity of the detecting point M1 potential=Vref1.

In this manner, the variable-voltage source 180 regulates the output voltage Vout according to the first reference voltage Vref1 inputted from the reference voltage setting unit 177, and supplies the output voltage Vout to the organic EL display unit 110.

Figures 5, 6:
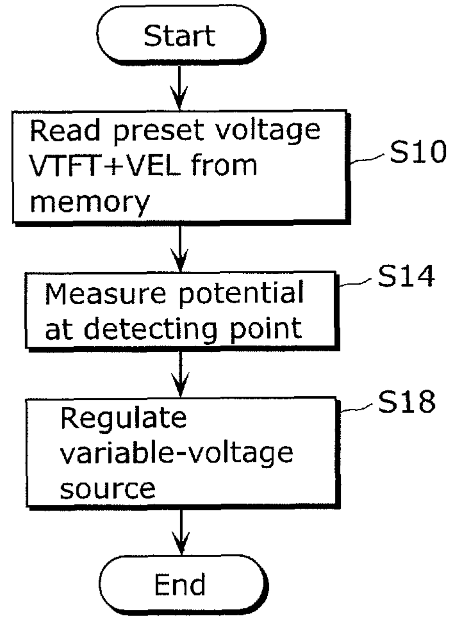
FIG. 5 is a flowchart showing the operation of the display device according to Embodiment 1.
FIG. 6 is a chart showing an example of the required voltage conversion table provided in a signal processing circuit according to Embodiment 1.

Next, the operation of the above-described display device 50 shall be described using FIG. 5 and FIG. 6.

FIG. 5 is a flowchart showing the operation of the display device 50 according to an exemplary embodiment of the present disclosure.

First, the reference voltage setting unit 177 reads, from a memory, the preset voltage (VEL+VTFT) corresponding to the peak gradation level (step S10).

Specifically, the reference voltage setting unit 177 determines the VTFT+VEL corresponding to the peak gradation levels for each color, using a required voltage conversion table indicating the required voltage VTFT+VEL corresponding to the peak gradation levels for each color.

FIG. 6 is a chart showing an example of a required voltage conversion table which is referenced by the reference voltage setting unit 177.

As shown in the figure, required voltages VTFT+VEL respectively corresponding to the peak gradation level (gradation level 255) are stored in the required voltage conversion table. For example, the required voltage at the peak gradation level of R is 11.2 V, the required voltage at the peak gradation level of G is 12.2 V, and the required voltage at the peak gradation level of B is 8.4 V. Among the required voltages at the peak gradation levels of the respective colors, the largest voltage is the 12.2 V of G. Therefore, the reference voltage setting unit 177 determines VTFT+VEL to be 12.2 V.

Furthermore, based on the sample pulse from the signal processing circuit 165, the potential at the detecting point M1 is detected via the monitor wire 190 and the sample-and-hold circuit 175 (step S14).

Subsequently, the variable-voltage source 180 regulates the output voltage Vout (step S18), and supplies the regulated output voltage Vout to the organic EL display unit 110. It is to be noted that the voltage regulating process in step S18 corresponds to the regulating.

Here, the signal processing circuit 165 generates an H level sample pulse to the variable-voltage source 180 in at least part of an image display period, and does not generate a sample pulse in a black display period. Therefore, the video data displayed on the organic EL display unit 110, the voltage applied to the panel (panel applied voltage), and the sample pulse are as described below.

Figure 7:
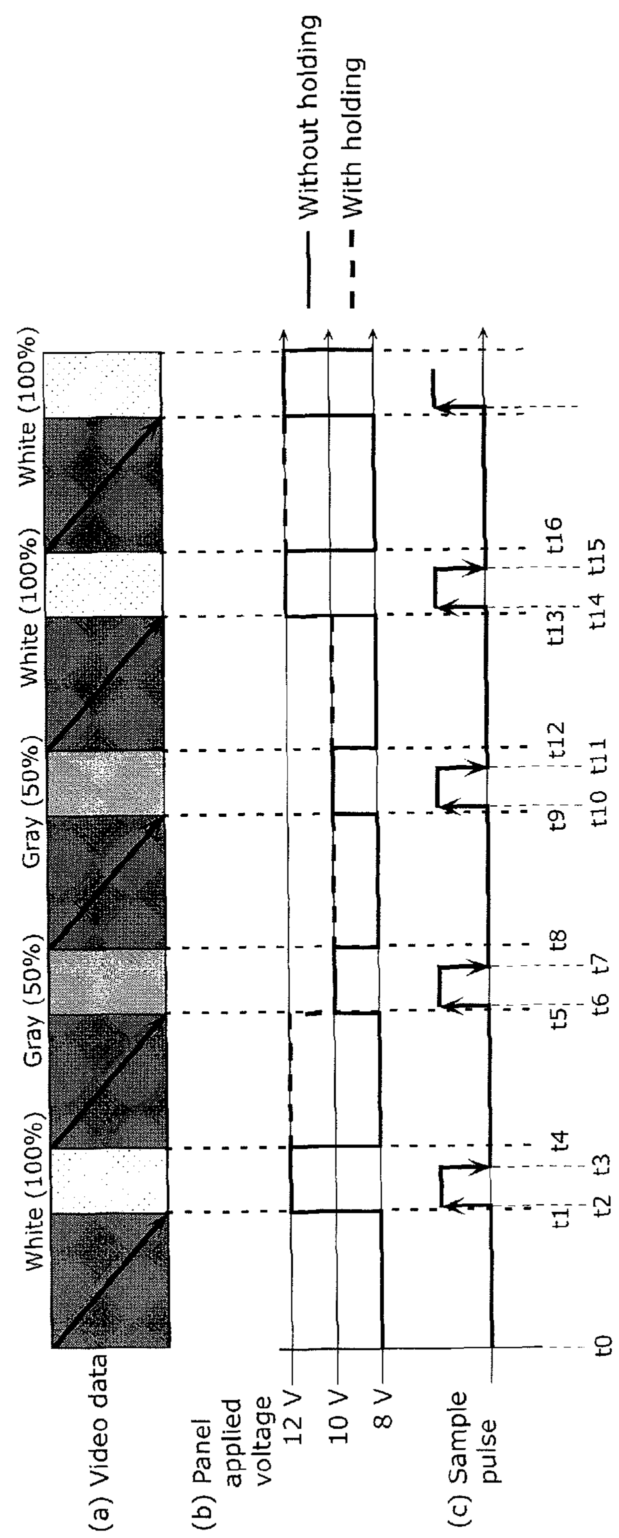
FIG. 7 is a diagram showing an example of the operation of the display device according to Embodiment 1.

FIG. 7 is a diagram showing an example of the operation of the display device 50; (a) shows video data displayed on the organic EL display unit 110; (b) shows the panel applied voltage; and (c) shows the sample pulse. FIG. 7 shows an example of the operation of the display device 50 when the monitor wire 190 and the sample-and-hold circuit 175 perform the detection of at least one of the high-side potential and the low-side potential in at least part of each image display period, and the monitor wire 190 and the sample-and-hold circuit 175 do not perform the detection of at least one of a high-side potential and a low-side potential in a black display period. Details are as described below.

(a) in FIG. 7 shows, with regard to each of the pixels 111 of the organic EL display unit 110, the changes over time in the displayed video of the video data displayed by the organic EL display unit 110. The vertical axis in the figure shows the screen vertical direction, and the horizontal axis shows time. Furthermore, t0 to t4 is equivalent to one frame period. Specifically, for example, in a time t=t0 to t1, video data is not displayed on the organic EL display unit 110 but video data is supplied sequentially, starting from the pixels 111 at the upper side of the organic EL display unit 110 to the pixels 111 at the bottom side. This period is referred to as a black display period. Subsequently, for example, in a time t=t1 to t4, the video data supplied starting from the pixels 111 at the upper side of the organic EL display unit 110 to the pixels 111 at the bottom side, is concurrently displayed on the organic EL display unit 110 This period is referred to as an image display period. Furthermore, assuming that a time t=t0 to t4 in the figure is the Nth frame and a time t=t4 to t8 is the N+1th frame, the figure shows that the video data of the white peak gradation level (R:G:B=255:255:255; luminance 100%) is supplied in the Nth frame and the video data of a gray gradation level (R:G:B=128:128:128; luminance 50%) is supplied in the N+1th frame. It is to be noted that a black display that is displayed on the organic EL display unit 110 in the black display period is a display that is realized by the luminescence control transistor being turned OFF by the luminescence control circuit, and is a different display from when video data of a black gradation level (for example, R:G:B=0:0:0) is displayed in an image display period.

As an example, when video data is displayed at 120 Hz, the time required for the writing and display of the video data is 5.5 ms, the black display period is 5.5 ms, and the image display period is 2.8 ms.

As shown in (c) in FIG. 7, the signal processing circuit 165 generates an H level sample pulse in at least part of an image display period, for example, in a time t=t2 to t3.

Specifically, the signal processing circuit 165 inputs the video data of the Nth frame into the pixel 111. Here, when the H level sample pulse is generated by the signal processing circuit in the time t=t2 to t3, the signal processing circuit 165 causes the sample-and-hold circuit 175 to sample the potential at the detecting point M1 and hold the sampled potential before the end of the image display period.

Here, since video data is not displayed on the organic EL display unit 110 in the black display period (t4 to t5) of the N+1th frame, there is no need to regulate the panel applied voltage for compensating for the voltage drop corresponding to the displayed video in the pixel 111. Specifically, as shown by the solid line in (b) in FIG. 7, conventionally, the variable-voltage source 180 supplies, in the image display period, a panel applied voltage (for example, output voltage Vout=12 V) for compensating for the voltage drop corresponding to the image display, and supplies, in the black display period, a panel applied voltage (for example, output voltage Vout=8 V) for compensating for the voltage drop corresponding to the black display. However, according to this embodiment, there is no need to supply a panel applied voltage (output voltage Vout=8 V) for the voltage drop corresponding to the black display in the black display period, and it is possible to continue supplying (hold) a panel applied voltage (output voltage Vout=12V) for compensating for the voltage drop corresponding to the image display of the Nth frame image display period even in the black display period, as shown by the broken line in the figure.

Specifically, in the black display period (t4 to t5) of the N+1th frame, the panel applied voltage (output voltage Vout=12V) for compensating for the voltage drop corresponding to the image display, which is held in the sample-and-hold circuit 175 is supplied to the organic EL display unit 110 from the variable-voltage source 180.

Furthermore, conventionally, when display is performed in the sequence starting from white gradation level image display, to black display, to gray gradation level image display as shown in (a) in FIG. 7, the panel applied voltage (output voltage Vout) changes from 12 V to 8 V to 10 V as shown in (b) in FIG. 7. However, in this embodiment, as shown by the broken line in the figure, the panel applied voltage (output voltage Vout) only changes from 12 V to 10 V, and thus it is possible to reduce excess power consumption (reactive power) and reduce power consumption.

It should be noted that it is sufficient to set the sample pulse to the L level up to the end of the image display period. Specifically, it is sufficient that sampling be performed within the image display period, for a period (for example, 1 ms) that is shorter than the image display period.

As described above, the display device 50 according to this embodiment includes the signal processing circuit 165, the sample-and-hold circuit 175 which performs the sample-and-hold operation based on the sample pulse from the signal processing circuit 165, the variable-voltage source 180, and the reference voltage setting unit 177. With this, the display device 50 is able to reduce excess voltage and reduce power consumption.

Furthermore, in the display device 50, the monitor pixel 111M is located near the center of the organic EL display unit 110, and thus the output voltage Vout of the variable-voltage source 180 can be easily regulated even when the size of the organic EL display unit 110 is increased.

Furthermore, since heat generation by the organic EL element 121 is suppressed through the reduction of power consumption, the deterioration of the organic EL element 121 can be prevented.

Figure 8:
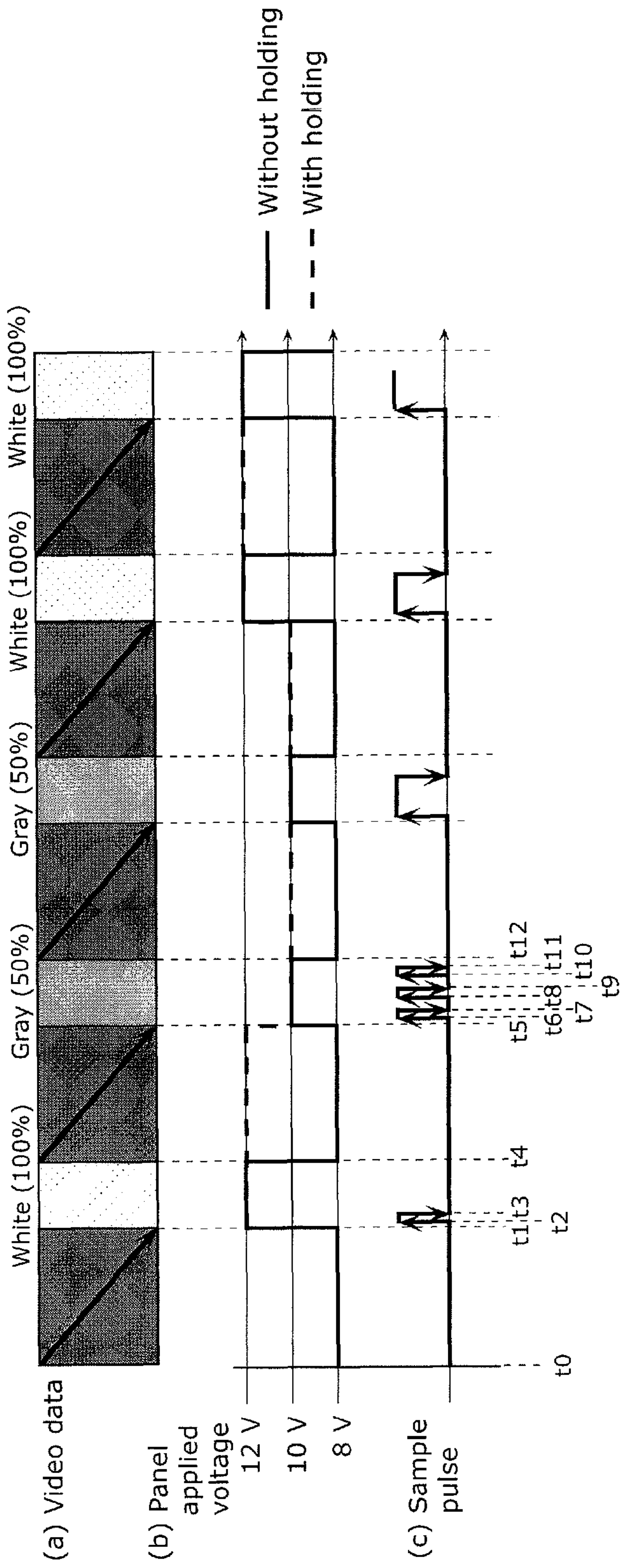
FIG. 8 is a diagram showing an example of a sample pulse according to Embodiment 1 of the present disclosure.

It is to be noted that the application pattern of the sample pulse is not limited to the above-described pattern shown in (c) of FIG. 7, and it is sufficient that it is performed within the image display period for a period that is shorter than the image display period. For example, FIG. 8 is a diagram showing an example of application pattern of the sample pulse by the signal processing circuit 165; (a) shows video data displayed on the organic EL display unit 110; (b) shows the panel applied voltage; and (c) shows the sample pulse.

For example, as shown in time t=t2 to t3 shown in (c) in FIG. 8, the sampling period may be shortened as much as possible. Here, as much as possible means within a range that the sample-and-hold circuit 175 can follow, and is for example 100 μs.

Furthermore, as shown in the times t=t6 to t7, t8 to t9, and t10 to t11 in (c) in FIG. 8, sampling may be performed several times.

Figure 9:
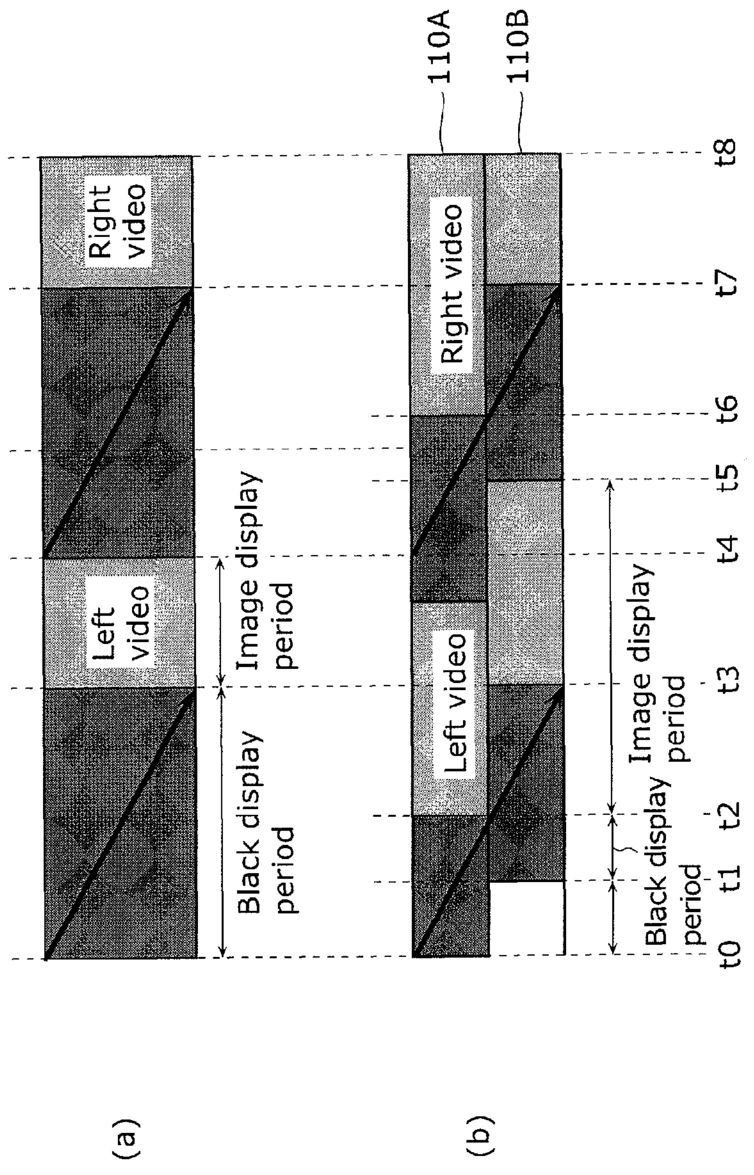
FIG. 9 is a diagram showing an example of video data according to Modification 2 of Embodiment 1 of the present disclosure.

Furthermore, the video data is not limited to two-dimensional display video, and may be three-dimensional display video data. FIG. 9 is a diagram showing an example of the video data displayed on the organic EL display unit 110; (a) shows three-dimensional display video data; and (b) shows the three-dimensional display video data in the case of subfield display.

As shown in (a) in FIG. 9, three-dimensional display of the video data is possible by alternately displaying left-eye images and left-eye images. Even in this case, it is possible to have a configuration in which the sample-and-hold circuit 175 performs the detection of the voltage at the detecting point M1 according to the H level sample pulse outputted by the signal processing circuit 165, at least during part of an image display period, and does not perform the detection of the voltage at the detection point M1 in a black display period.

Furthermore, as shown in (b) in FIG. 9, even in display according to the subfield method in which the organic EL display unit 110 is driven and displays video on a per plural display region basis, the sample-and-hold circuit 175 performs the detection of the voltage at the detecting point M1 according to the H level sample pulse outputted from the signal processing circuit 165 in at least part of the image display period, and does not perform the detection of the voltage at the detecting point M1 in a black display period for the entire screen.

Specifically, as shown in (b) in FIG. 9, the organic EL display unit 110 includes (i) a first subfield 110 made up of the pixels provided in a display region on the upper half of the organic EL display unit 110 and (ii) a second subfield 1106 made up of the pixels provided in a display region on the lower half. The first subfield 110A and the second subfield 1106 have different image display period and black display period timings in conformity to the writing of video data to the organic EL display unit 110. For example, in the display according to subfield method shown in (b) in FIG. 9, the start of black display period of the second subfield is 2.8 ms slower than the start of the black display period of the first subfield. With this, there are cases where the first subfield and the second subfield are in the black display period and cases where the first subfield and the second subfield are in the image display period. With this display method, a long image display period can be provided.

Here, the sample-and-hold operation of the sample-and-hold circuit 175 is performed in a period (t2 to t5) in which either the first subfield or the second subfield is in the image display period. Specifically, voltage sampling is performed from a time that is simultaneous to or after the start of the image display period of the first subfield up to a time that is earlier than the end of the image display period of the second subfield. With this, it is possible to reduce excess voltage and reduce power consumption even in the display of three-dimensional video data. The pulse time of the sample pulse is for example 6.25 ms.

According to the above-described configuration, it is possible to provide a display device having excellent power consumption reducing effect.

It is to be noted that the above described subfields are not limited to those in which the first subfield is made up of the pixels provided in the display region on the upper half of the organic EL display unit 110 and the second subfield 1106 is made up of the pixels provided in the display region on the lower half. For example, the first subfield may be made up of the pixels provided in odd lines and the second subfield may be made up of the pixels provided in even lines.

Embodiment 2

Compared to the display device according to Embodiment 1, a display device according to this embodiment is different in that the reference voltage that is inputted to a variable-voltage source changes depending on a peak signal detected, for each frame, from the inputted video data. Hereinafter, description shall not be repeated for points which are the same as in Embodiment 1 and shall be centered on the points of difference from Embodiment 1. Furthermore, the figures applied to Embodiment 1 shall be used for figures that would otherwise overlap with those in Embodiment 1.

Hereinafter, Embodiment 2 of the present disclosure shall be specifically described with reference to the Drawings.

Figure 10:
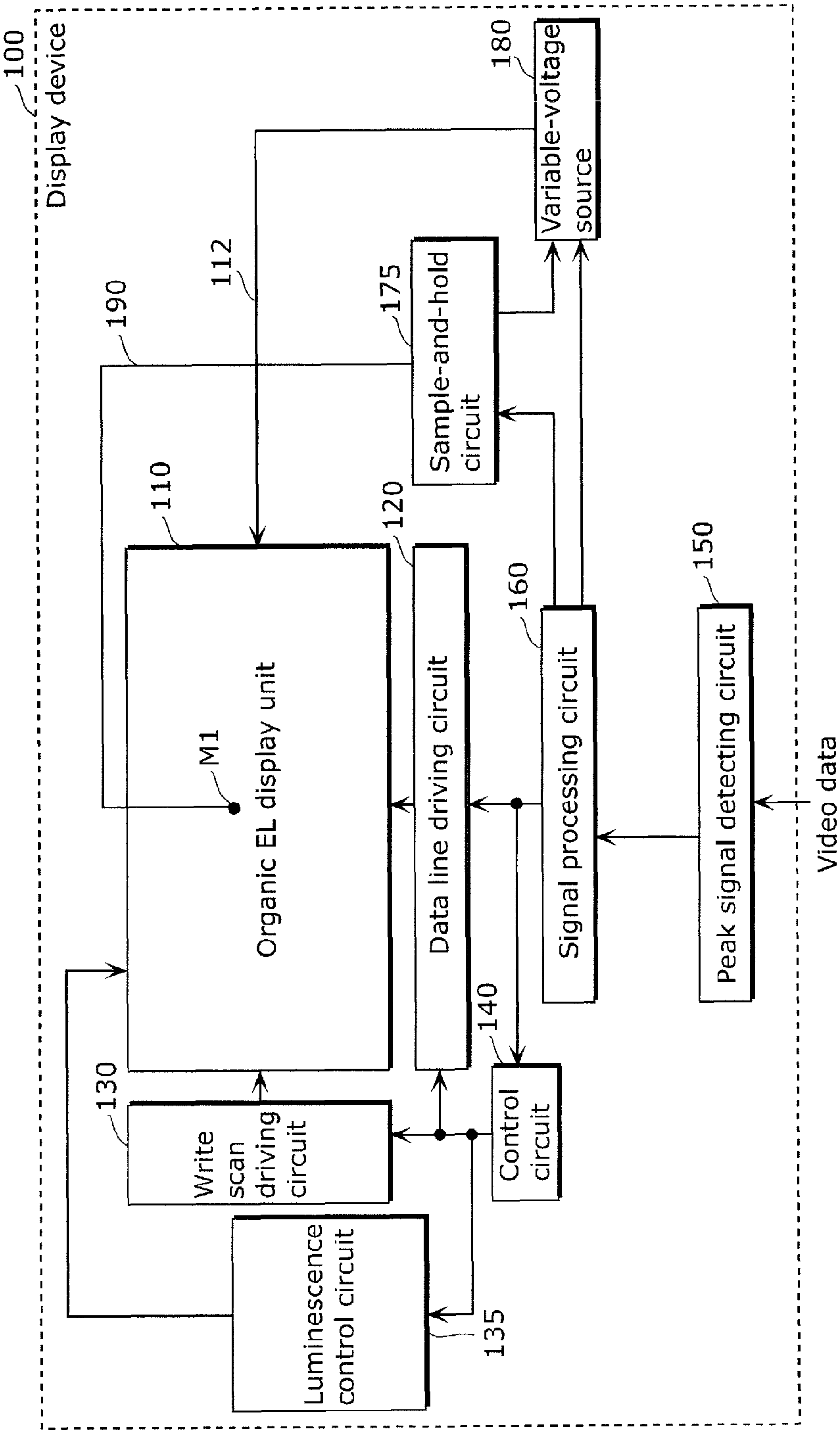
FIG. 10 is a block diagram showing an outline configuration of a display device according to Embodiment 2 of the present disclosure.

FIG. 10 is a block diagram showing an outline configuration of the display device according to Embodiment 2 of the present disclosure.

A display device 100 shown in the figure includes the organic electroluminescence (EL) display unit 110, the data line driving circuit 120, the write scan driving circuit 130, the luminescence control circuit 135, the control circuit 140, a peak signal detecting circuit 150, a signal processing circuit 160, the sample-and-hold circuit 175, the variable-voltage source 180, and the monitor wire 190.

The configuration of the organic EL display unit 110 is the same as that shown in FIG. 2 and FIG. 3 in Embodiment 1.

As shown in the figure, the organic EL display unit 110 includes the pixels 111, the first power source wire 112, and the second power source wire 113.

The peak signal detecting circuit 150 detects the peak value of the video data inputted to the display device 100, and outputs a peak signal representing the detected peak value to the signal processing circuit 160. Specifically, the peak signal detecting circuit 150 detects, as a peak value, data of the highest gradation level for each color, from the video data. High gradation level data corresponds to an image that is to be displayed brightly by the organic EL display unit 110.

The signal processing circuit 160 determines a second reference voltage Vref2 to be outputted to the variable-voltage source 180, from the peak signal outputted by the peak signal detecting circuit 150. Specifically, the signal processing circuit 160 uses the required voltage conversion table and determines the sum VTFT+VEL of the voltage VEL required by the organic EL element 121 and the voltage VTFT required by the driving transistor 125. Subsequently, the signal processing circuit 160 sets the determined VTFT+VEL as the voltage of the second reference voltage Vref2. Specifically, the second reference voltage Vref2 outputted by the signal processing circuit 160 to the variable-voltage source 180 is a voltage that is not dependent on the potential difference ΔV between the output voltage Vout of the variable-voltage source 180 and the potential at the detecting point M1.

The sample-and-hold circuit 175 performs a sample-and-hold operation, based on a sample pulse from the signal processing circuit 165. The sample-and-hold circuit 175 samples the potential at the detecting point M1 and continues to output the sampled potential to the variable-voltage source 180, according to the pulse timing of the sample pulse from the signal processing circuit 160. In periods other than the sampling period, the sample-and-hold circuit 175 holds the potential at the detecting point M1 that was sampled immediately before such period and continues outputting the held potential to the variable-voltage source 180. It is to be noted that the monitor wire 190 and the sample-and-hold circuit 175 correspond to the voltage detecting unit.

Furthermore, the signal processing circuit 160 outputs, to the data line driving circuit 120, a signal voltage corresponding to the video data inputted via the peak signal detecting circuit 150.

The variable-voltage source 180, which is the voltage regulating unit, regulates the output voltage so as to set the potential of the monitor pixel 111 to a predetermined potential. The variable-voltage source 180 measures the high-side potential applied to the monitor pixel 111M, via the monitor wire 190 and the sample-and-hold circuit 175. Specifically, the variable-voltage source 180 measures the potential at the detecting point M1. Subsequently, the variable-voltage source 180 regulates the output voltage Vout in accordance with the measured potential at the detecting point M1 and the second reference voltage Vref2 outputted by the signal processing circuit 160. It is to be noted that the variable-voltage source 180 may measure the low-side potential applied to the monitor pixel 111M.

The monitor wire 190 has one end connected to the detecting point M1 and the other end connected to the sample-and-hold circuit 175, and transmits the potential at the detecting point M1 to the variable-voltage source 180.

Figure 11:
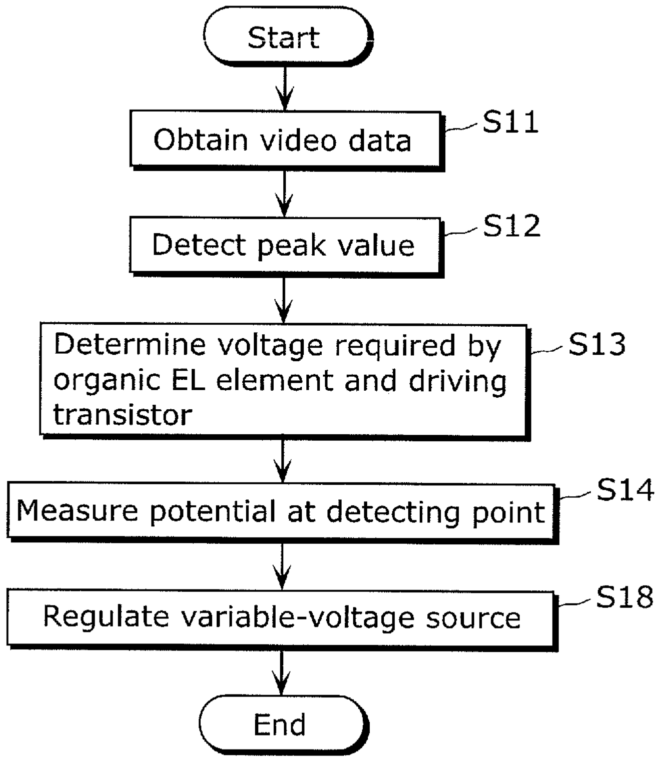
FIG. 11 is a flowchart showing the operation of a display device according to Embodiment 2.

Next, the operation of the aforementioned display device 100 shall be described using FIG. 11 and FIG. 12.

FIG. 11 is a flowchart showing the operation of the display device 100 according to an exemplary embodiment of the present disclosure.

First, the peak signal detecting circuit 150 obtains the video data for one frame period inputted to the display device 100 (step S11). For example, the peak signal detecting circuit 150 includes a buffer and stores the video data for one frame period in such buffer.

Next, the peak signal detecting circuit 150 detects the peak value of the obtained video data (step S12), and outputs a peak signal representing the detected peak value to the signal processing circuit 160. Specifically, the peak signal detecting circuit 150 detects the peak value of the video data for each color. For example, for each of red (R), green (G), and blue (B), the video data is expressed using the 256 gradation levels from 0 to 255 (luminance being higher with a larger value). Here, when part of the video data of the organic EL display unit 110 has R:G:B=177:124:135, another part of the video data of the organic EL display unit 110 has R:G:B=24:177:50, and yet another part of the video data of the organic EL display unit 110 has R:G:B=10:70:176, the peak signal detecting circuit 150 detects 177 as the peak value of R, 177 for the peak value of G, and 176 as the peak value of B, and outputs, to the signal processing circuit 160, a peak signal representing the detected peak value of each color.

Next, the signal processing circuit 160 determines the voltage VTFT required by the driving transistor 125 and the voltage VEL required by the organic EL element 121 when causing the organic EL element 121 to produce luminescence according to the peak values outputted by the peak signal detecting circuit 150 (step S13). Specifically, the signal processing circuit 160 determines the VTFT+VEL corresponding to the gradation levels for each color, using a required voltage conversion table indicating the required voltage VTFT+VEL corresponding to the gradation levels for each color.

FIG. 12 is a chart showing an example of the required voltage conversion table provided in the signal processing circuit 160.

As shown in the figure, required voltages VTFT+VEL respectively corresponding to the gradation levels of each color are stored in the required voltage conversion table. For example, the required voltage corresponding to the peak value 177 of R is 8.5 V, the required voltage corresponding to the peak value 177 of G is 9.9 V, and the required voltage corresponding to the peak value 176 of B is 6.7 V. Among the required voltages corresponding to the peak values of the respective colors, the largest voltage is 9.9 V corresponding to the peak value of G. Therefore, the signal processing circuit 160 determines VTFT+VEL to be 9.9 V.

Meanwhile, the potential at the detecting point M1 is detected via the monitor wire 190 and the sample-and-hold circuit 175, based on the sample pulse from the signal processing circuit 160 (step S14).

Subsequently, the variable-voltage source 180 regulates the output voltage Vout (step S18), and supplies the regulated output voltage Vout to the organic EL display unit 110. It is to be noted that the voltage regulating process in step S18 corresponds to the regulating.

Furthermore, the signal processing circuit 160 generates an H level sample pulse to the variable-voltage source 180 in at least part of an image display period, and does not generate a sample pulse in a black display period. Therefore, the video data displayed on the organic EL display unit 110, the panel applied voltage, and the sample pulse are the same as those in Embodiment 1 shown in FIG. 7.

As described above, the display device 100 according to this embodiment includes the peak signal detecting circuit 150, the signal processing circuit 160, the sample-and-hold circuit 175 which performs the sample-and-hold operation based on the sample pulse from the signal processing circuit 160, and the variable-voltage source 180 which output a high-side potential and a low-side potential.

With this, the display device 100 is able to reduce excess voltage and reduce power consumption.

Furthermore, in the display device 100, the monitor pixel 111M is located near the center of the organic EL display unit 110, and thus the output voltage Vout of the variable-voltage source 180 can be easily regulated even when the size of the organic EL display unit 110 is increased.

Furthermore, since heat generation by the organic EL element 121 is suppressed through the reduction of power consumption, the deterioration of the organic EL element 121 can be prevented.

Embodiment 3

Compared to the display device 100 according to Embodiment 2, a display device according to the present embodiment is different in measuring the high-side potential of each of two or more luminescent pixels 111, and regulating the variable-voltage source 180 based on the lowest potential out of the measured potentials and the reference potential.

With this, the output voltage Vout of the variable-voltage source 180 can be more appropriately regulated. Therefore, power consumption can be effectively reduced even when the size of the organic EL display unit is increased.

Figure 13:
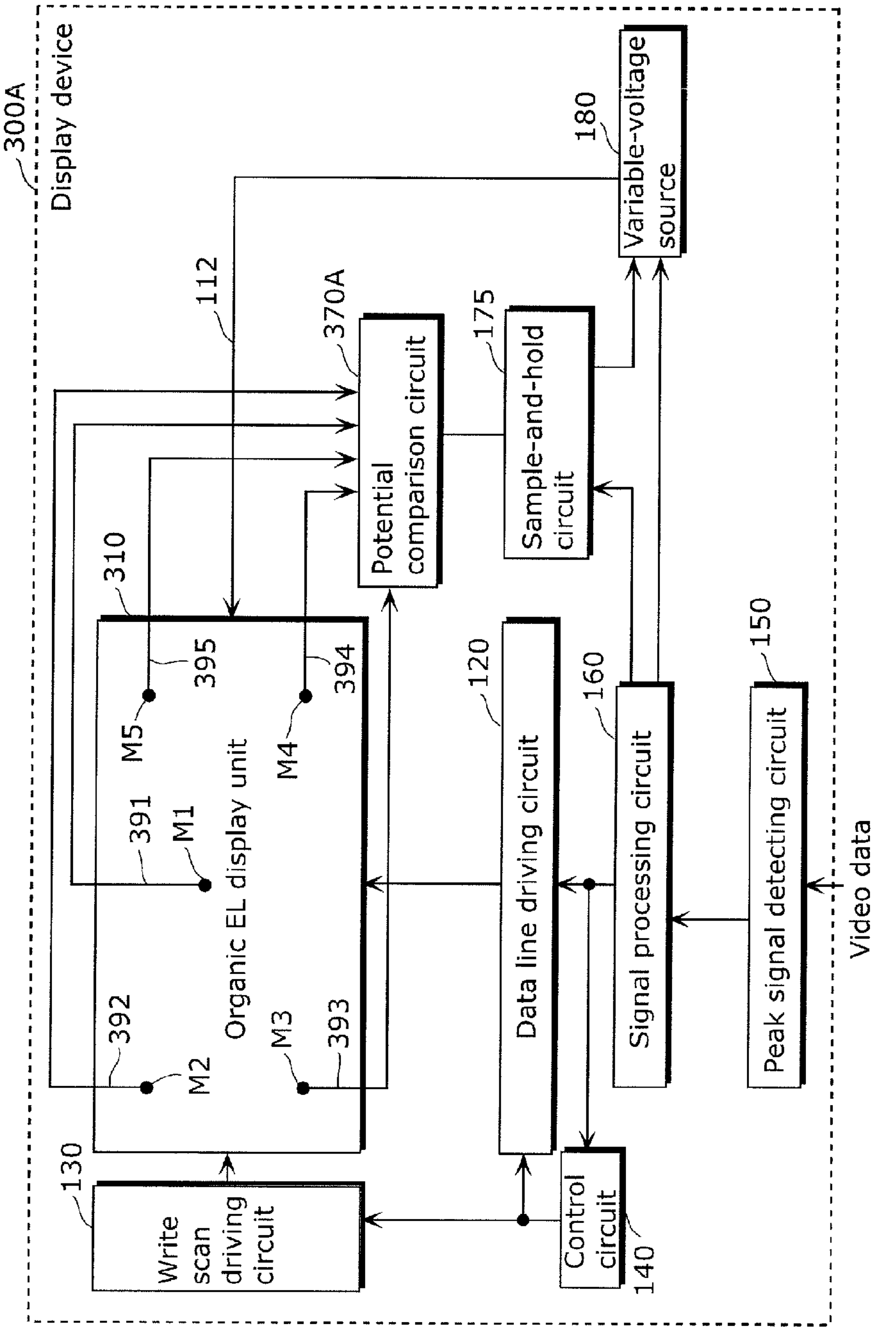
FIG. 13 is a block diagram showing an example of an outline configuration of a display device according to Embodiment 3 of the present disclosure.

FIG. 13 is a block diagram showing an example of an outline configuration of the display device according to Embodiment 3 of the present disclosure.

A display device 300A according to this embodiment shown in the figure is nearly the same as the display device 100 according to Embodiment 2 shown in FIG. 10, but is different compared to the display device 100 in further including a potential comparison circuit 370A, and in including an organic EL display unit 310 in place of the organic EL display unit 110, and monitor wires 391 to 395 in place of the of the monitor wire 190. It should be noted that illustration of the luminance control circuit 135 is omitted in FIG. 13.

The organic EL display unit 310 is nearly the same as the organic EL display unit 110 but is different compared to the organic EL display unit 110 in the placement of the monitor wires 391 to 395 which are provided, on a one-to-one correspondence with detecting points M1 to M5, for measuring the potential at the corresponding detecting point.

It is preferable to provide the detecting points M1 to M5 evenly inside the organic EL display unit 310; for example, at the center of the organic EL display unit 310 and at the center of each region obtained by dividing the organic EL display unit 310 into four as shown in FIG. 13. It is to be noted that although the five detecting points M1 to M5 are illustrated in the figure, having even two or three detecting points is sufficient, as long as there are plural detecting points.

Each of the monitor wires 391 to 395 is connected to the corresponding one of the detecting points M1 to M5 and to the potential comparison circuit 370A, and transmits the potential of the corresponding one of the detecting points M1 to M5 to the potential comparison circuit 370A. With this, the potential comparison circuit 370A can measure the potentials at the detecting points M1 to M5 via the monitor wires 391 to 395.

The potential comparison circuit 370A measures the potentials at the detecting points M1 to M5 via the monitor wires 391 to 395. Stated differently, the potential comparison circuit 370A measures the high-side potential applied to plural monitor pixels 111M. In addition, the potential comparison circuit 370A selects the lowest potential among the measured potentials at the detecting points M1 to M5.

The sample-and-hold circuit 175 performs, based on a sample pulse from the signal processing circuit 165, a sample-and-hold operation of sampling and holding the lowest potential. In periods other than the sampling period, the sample-and-hold circuit 175 holds the lowest potential that was sampled immediately before such period and continues outputting the lowest potential to the variable-voltage source 180. It is to be noted that the monitor wires 391 to 395, the potential comparison circuit 370A, and the sample-and-hold circuit 175 correspond to the voltage detecting unit.

The variable-voltage source 180 outputs, to the organic EL display unit 310, an output voltage Vout that has been regulated so that the lowest potential among the potentials of the monitor pixels 111M is set to the predetermined potential.

As described above, in the display device 300A according to this embodiment, the potential comparison circuit 370A measures the high-side potential applied to each of the pixels 111 inside the organic EL display unit 310, and selects the lowest potential among the measured potentials of the pixels

111. Then, the variable-voltage source regulates the output voltage based on the lowest potential among the potentials of the pixels 111 and the reference potential.

It is to be noted that, in the display device 300A according to this embodiment: the variable-voltage source 180 is the power supplying unit; the organic EL display unit 310 is the display unit; and the variable-voltage source 180 is the voltage regulating unit.

Although the display device according to the present disclosure has been described thus far based on the embodiments, the display device according to the present disclosure is not limited to the above-described embodiments. Modifications that can be obtained by executing various modifications to Embodiments 1 to 3 that are conceivable to a person of ordinary skill in the art without departing from the essence of the inventive concept, and various devices internally equipped with the display device according to the present disclosure are included in the inventive concept of the present disclosure.

For example, the drop in the pixel luminance of the pixel to which the monitor wire inside the organic EL display unit is provided may be compensated.

Furthermore, although the signal processing circuit has the required voltage conversion table indicating the required voltage VTFT+VEL corresponding to the gradation levels of each color, the signal processing circuit may have, in place of the required voltage conversion table, the current-voltage characteristics of the driving transistor 125 and the current-voltage characteristics of the organic EL element 121, and determine VTFT+VEL by using these two current-voltage characteristics.

Figure 14:
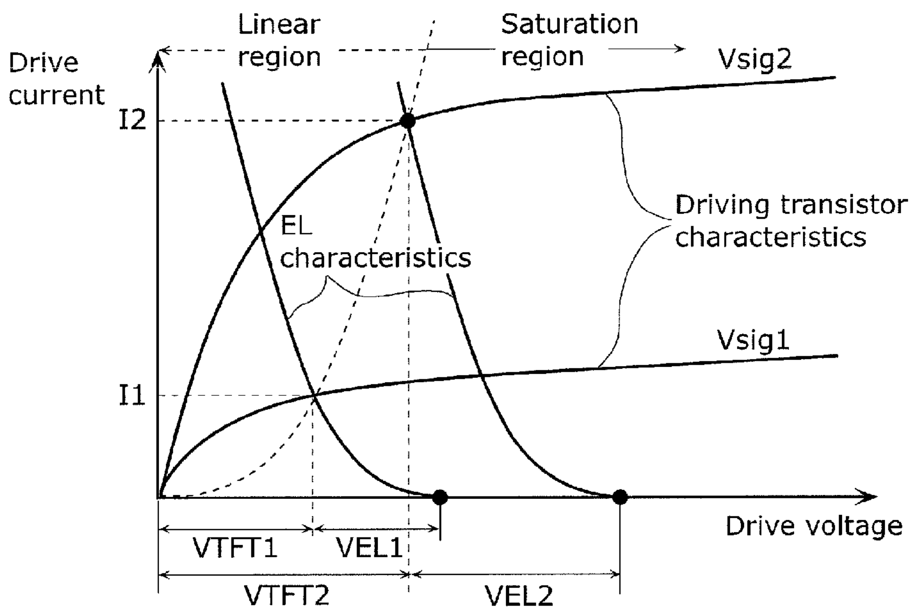
FIG. 14 is a graph showing together current-voltage characteristics of a driving transistor and current-voltage characteristics of an organic EL element.

FIG. 14 is a graph showing together current-voltage characteristics of the driving transistor and current-voltage characteristics of the organic EL element. In the horizontal axis, the direction of dropping with respect to the source potential of the driving transistor is the normal direction.

In the figure, current-voltage characteristics of the driving transistor and current-voltage characteristics of the organic EL element which correspond to two different gradation levels are shown, and the current-voltage characteristics of the driving transistor corresponding to a low gradation level is indicated by Vsig1 and the current-voltage characteristics of the driving transistor corresponding to a high gradation level is indicated by Vsig2.

In order to eliminate the impact of display defects due to changes in the source-to-drain voltage of the driving transistor, it is necessary to cause the driving transistor to operate in the saturation region. On the other hand, the pixel luminescence of the organic EL element is determined according to the drive current. Therefore, in order to cause the organic EL element to produce luminescence precisely in accordance with the gradation level of video data, it is sufficient that the voltage remaining after the drive voltage (VEL) of the organic EL element corresponding to the drive current of the organic EL element is deducted from the voltage between the source electrode of the driving transistor and the cathode electrode of the organic EL element is a voltage that can cause the driving transistor to operate in the saturation region. Furthermore, in order to reduce power consumption, it is preferable that the drive voltage (VTFT) of the driving transistor be low.

Therefore, in FIG. 14, the organic EL element produces luminescence precisely in accordance with the gradation level of the video data and power consumption can be reduced most with the VTFT+VEL that is obtained through the characteristics passing the point of intersection of the current-voltage characteristics of the driving transistor and the current-voltage characteristics of the organic EL element on the line indicating the boundary between the linear region and the saturation region of the driving transistor.

In this manner, the required voltage VTFT+VEL corresponding to the gradation levels for each color may be calculated using the graph shown in FIG. 14.

With this, power consumption can be further reduced.

Furthermore, in Embodiments 1 to 3, the signal processing circuit may change the first reference voltage Vref1 or the second reference voltage Vref2 on a plural frame (for example, a 3-frame) basis instead of changing the first reference voltage Vref1 or the second reference voltage Vref2 on a per frame basis.

With this, the power consumption occurring in the variable-voltage source 180 can be reduced because the potential of the first reference voltage Vref1 or the second reference voltage Vref2 fluctuates.

Furthermore, in the flowcharts shown in FIG. 5 and FIG. 12, the process of detecting the potential at the detecting point (step S14) may be executed over plural frames.

Furthermore, the signal processing circuit may regulate the voltage outputted from the variable-voltage source or may regulate either the high-side output potential or the low-side output potential that are outputted by the power supplying unit, so that any one from among (i) the potential difference between the high-side potential and the reference potential, (ii) the potential difference between the low-side potential and the reference potential, and (iii) the potential difference between the high-side potential and the low-side potential, reaches a predetermined potential difference.

Furthermore, there may be one pixel or plural pixels for detecting the applied voltage. Furthermore, the high-side potential of the pixel for detecting the applied voltage may be detected, or the low-side potential of such pixel may be detected. Furthermore, the variable-voltage source may regulate the power supplying unit based on the lowest applied potential among the detected high-side applied potentials, and may regulate the power supplying unit based on the highest applied potential among the detected low-side applied potentials.

Furthermore, the reference voltage setting unit and the signal processing circuit may determine the first reference voltage Vref1 and the second reference voltage Vref2 with consideration being given to an aged deterioration margin for the organic EL element 121. For example, assuming that the aged deterioration margin for the organic EL element 121 is Vad, the signal processing circuit 165 may determine the voltage of the first reference voltage Vref1 to be VTFT+VEL+Vad, and the signal processing circuit 160 may determine the voltage of the second reference voltage Vref2 to be VTFT+VEL+Vad.

Furthermore, although the switch transistor 124, the luminescence control transistor 127, and the driving transistor 125 are described as being P-type transistors in the above-described embodiments, they may be configured of N-type transistors.

Furthermore, although the switch transistor 124, the luminescence control transistor 127, and the driving transistor 125 are TFTs, they may be other field-effect transistors.

Furthermore, the processing units included in the display devices according to Embodiment 1 to 3 described above are typically implemented as an LSI which is an integrated circuit. Furthermore, part of the processing units included in the above described display devices may also be integrated on the same substrate as the organic EL display unit. Furthermore, they may be implemented as a dedicated circuit or a general-purpose processor. Furthermore, a Field Programmable Gate Array (FPGA) which allows programming after LSI manufacturing or a reconfigurable processor which allows reconfiguration of the connections and settings of circuit cells inside the LSI may be used.

Furthermore, part of the functions of the data line driving circuit, the write scan driving circuit, the luminescence control circuit, the control circuit, the peak signal detecting circuit, and the signal processing circuit that are included in the display devices in Embodiments 1 to 3 of the present disclosure may be implemented by having a processor such as a CPU execute a program. Furthermore, the present inventive concept may also be implemented as a method of driving a display device which includes the characteristic steps implemented through the respective processing units included in the display devices described above.

Furthermore, although the foregoing descriptions exemplify the case where the display devices according to Embodiments 1 to 3 are active matrix-type organic EL display devices, the present inventive concept may be applied to organic EL display devices other than the active matrix-type, and may be applied to a display device other than an organic EL display device using a current-driven luminescence element, such as a liquid crystal display device.

Figure 15:
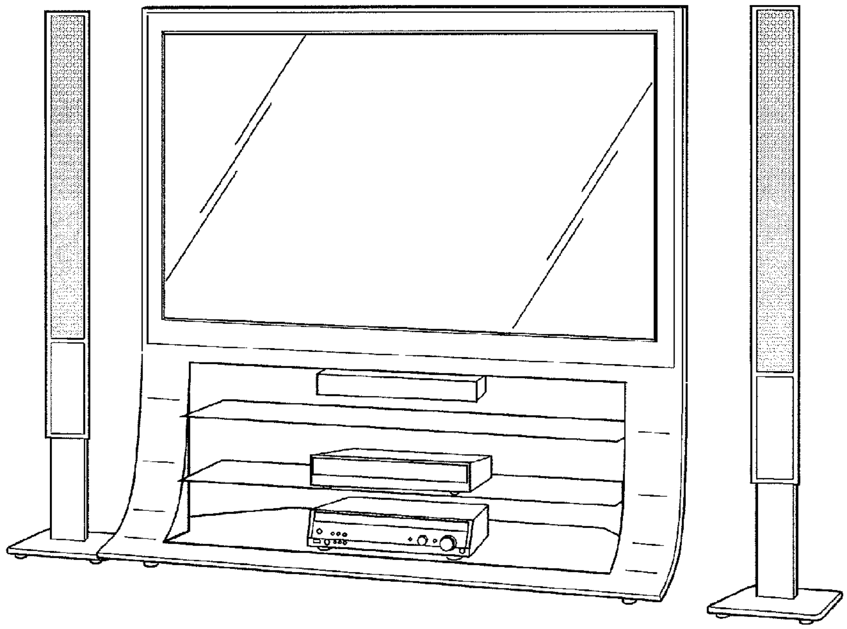
FIG. 15 is an external view of a thin flat-screen TV incorporating the display device according to the an exemplary embodiment of the present disclosure.

Furthermore, for example, a display device according to one or more exemplary embodiments of the present disclosure is built into a thin flat-screen TV such as that shown in FIG. 15. A thin, flat-screen TV capable of high-accuracy image display reflecting a video signal is implemented by having the display device according to the exemplary embodiments of the present disclosure built into the TV.

Although only some exemplary embodiments of the present disclosure have been described in detail above, those skilled in the art will readily appreciate that many modifications are possible in the exemplary embodiments without materially departing from the novel teachings and advantages of the present inventive concept. Accordingly, all such modifications are intended to be included within the scope of the inventive concept of the present disclosure.

INDUSTRIAL APPLICABILITY

One or more exemplary embodiments of the present disclosure is particularly useful as an active-type organic EL flat panel display.

The invention claimed is:

1. A display device comprising:

a power supplying unit configured to output a high-side output potential and a low-side output potential;

a display unit in which a plurality of pixels are arranged and which receives power supply from the power supplying unit;

a voltage detecting unit configured to detect at least one of a high-side applied potential and a low-side applied potential which are applied to at least one of the pixels inside the display unit; and a voltage regulating unit configured to regulate at least one of the high-side output potential and the low-side output potential that are outputted from the power supplying unit such that any one of the following potential differences reaches a predetermined potential difference: a potential difference between the high-side applied potential and a reference potential; a potential difference between the low-side applied potential and the reference potential; and a potential difference between the high-side applied potential and the low-side applied potential, wherein the display unit is configured to alternate between image display periods in which at least part of the pixels are used for image display and black display periods in which all of the pixels are used for black display, and the voltage detecting unit is configured to detect the at least one of the high-side applied potential and the low-side applied potential in at least part of each of the image display periods, and refrain from detecting the at least one of the high-side applied potential and the low-side applied potential in the black display periods.

2. The display device according to claim 1, wherein the voltage detecting unit includes a sample-and-hold circuit which samples and holds the at least one of the high-side applied potential and the low-side applied potential based on a sampling signal.

3. The display device according to claim 2, wherein the sample-and-hold circuit samples the at least one of the high-side applied potential and the low-side applied potential from a start of each of the image display periods, and holds the sampled applied potential before an end of the image display period.

4. The display device according to claim 3, wherein the sample-and-hold circuit performs the sampling simultaneously with the start of the image display period.

5. The display device according to claim 4, wherein the sample-and-hold circuit performs the sampling for a period that is shorter than the image display period.

6. The display device according to claim 2, wherein the sample hold circuit performs the sampling more than once within one of the image display periods.

7. The display device according to claim 1, wherein each of the pixels includes an organic electroluminescence (EL) element.

8. The display device according to claim 1, wherein the display unit is configured to alternately display images for a right eye and images for a left eye, in two of the image display periods that are successive via one of the black display periods, and the images for the right eye and the images for the left eye can be viewed as three-dimensional images via a pair of eyeglasses that allow sequential viewing of the images for the right eye and the images for the left eye.

9. The display device according to claim 1, wherein the display unit is configured to display images according to a subfield method in which one frame is divided into subfields having different image display periods, and a subfield is selected from among the subfields according to display gradation level.

10. The display device according to claim 1, wherein the voltage detecting unit is configured to refrain from detecting the at least one of the high-side applied potential and the low-side applied potential in an image display period in which a full-screen black image is displayed, among the image display periods.

11. The display device according to claim 1, wherein the display unit is configured to cause the pixels to simultaneously produce luminescence in the image display periods, and cause the pixels to simultaneously stop producing luminescence in the black display periods.

12. The display device according to claim 1, wherein the at least one of the pixels from which the high-side applied potential is detected and the at least one of the pixels from which the low-side applied potential is detected are different pixels.

13. The display device according to claim 1, wherein at least one of (i) the number of the at least one of the pixels from which the high-side applied potential is detected and (ii) the number of the at least one of the pixels from which the low-side applied potential is detected is plural.

14. The display device according to claim 13, wherein the voltage regulating unit is configured to select at least one applied potential out of (i) a lowest applied potential among high-side applied potentials detected by the voltage detecting unit; and (ii) a highest applied potential among low-side applied potentials detected by the voltage detecting unit, and regulate the power supplying unit based on the selected at least one applied potential.

15. The display device according to claim 1, further comprising at least one of:

a high-side potential detecting line having one end connected to the at least one of the pixels from which the high-side applied potential is detected and the other end connected to the voltage regulating unit, for transmitting the high-side applied potential; and a low-side potential detecting line having one end connected to the at least one of the pixels from which the low-side applied potential is detected and the other end connected to the voltage regulating unit, for transmitting the low-side applied potential.

16. The display device according to claim 1, wherein the voltage detecting unit is further configured to detect at least one of the high-side output potential and the low-side output potential that are outputted from the power supplying unit, and the voltage regulating unit is configured to regulate the at least one of the high-side output potential and the low-side output potential that are outputted from the power supplying unit, in accordance with at least one potential difference out of (i) a potential difference between the high-side output potential outputted by the power supplying unit and the high-side applied potential applied to the at least one of the pixels and (ii) a potential difference between the low-side output potential outputted by the power supplying unit and the low-side applied potential applied to the at least one of the pixels.

17. The display device according to claim 16, wherein the voltage regulating unit is configured to regulate the at least one of the high-side output potential and the low-side output potential that are outputted from the power supplying unit, so that (i) the at least one potential difference and (ii) at least one of the potential difference between the high-side applied potential and the reference potential and the potential difference between the low-side applied potential and the reference potential are in an increasing function relationship.

18. The display device according to claim 1, wherein the voltage detecting unit is further configured to detect at least one of (i) a high-side potential in a current path connecting the power supplying unit and a high potential side of the pixels and (ii) a low-side potential in current path connecting the power supplying unit and a low potential side of the pixels, and the voltage regulating unit is configured to regulate the at least one of the high-side output potential and the low-side output potential that are outputted from the power supplying unit, in accordance with at least one potential difference out of (i) a potential difference between the high-side potential in the current path connecting the power supplying unit and the high potential side of the pixels and the high-side applied potential applied to the at least one of the pixels and (ii) a potential difference between the low-side potential in the current path connecting the power supplying unit and the low potential side of the pixels and the low-side applied potential applied to the at least one of the pixels.

19. The display device according to claim 18, wherein the voltage regulating unit is configured to perform the regulating so that (i) the at least one potential difference and (ii) at least one of the potential difference between the high-side applied potential and the reference potential and the potential difference between the low-side applied potential and the reference potential are in an increasing function relationship.

20. A method of driving a display device including a power supplying unit which outputs a high-side output potential and a low-side output potential and a display unit in which a plurality of pixels are arranged and which receives power supply from the power supplying unit, the method comprising:

detecting at least one of a high-side applied potential and a low-side applied potential which are applied to at least one of the pixels inside the display unit;

regulating at least one of the high-side output potential and the low-side output potential that are outputted from the power supplying unit such that any one of the following potential differences reaches a predetermined potential difference: a potential difference between the high-side applied potential and a reference potential; a potential difference between the low-side applied potential and the reference potential; and a potential difference between the high-side applied potential and the low-side applied potential, wherein the display unit is configured to alternate between image display periods in which at least part of the pixels are used for image display and black display periods in which all of the pixels are used for black display, and the detecting is performed in at least part of each of the image display periods, and is not performed in the black display periods.

* * * * *